(12) United States Patent
Laflamme et al.

(10) Patent No.: US 12,476,444 B2
(45) Date of Patent: Nov. 18, 2025

(54) METHODS AND APPARATUS FOR SUPPORTING WIRES IN OPENINGS

(71) Applicant: Amphenol Corporation, Wallingford, CT (US)

(72) Inventors: Dimitri Laflamme, Longueuil (CA); Mathieu Desjardins, Montreal (CA); Jeremi Proulx, Boucherville (CA); Rachid Ouallou, Chambly (CA)

(73) Assignee: Amphenol Corporation, Wallingford, CT (US)

( * ) Notice: Subject to any disclaimer, the term of this patent is extended or adjusted under 35 U.S.C. 154(b) by 226 days.

(21) Appl. No.: 18/209,027

(22) Filed: Jun. 13, 2023

(65) Prior Publication Data

US 2023/0402828 A1    Dec. 14, 2023

Related U.S. Application Data

(60) Provisional application No. 63/352,104, filed on Jun. 14, 2022.

(51) Int. Cl.
*H02G 3/22*     (2006.01)
*H02G 3/04*     (2006.01)

(52) U.S. Cl.
CPC .............. *H02G 3/22* (2013.01); *H02G 3/04* (2013.01)

(58) Field of Classification Search
CPC .. H02G 3/22; H02G 3/04; H02G 3/26; H02G 3/28; H02G 3/30; H02G 3/32; H02G 3/03; H02G 3/36; B60R 16/0222; B60R 16/0207
USPC .... 174/650, 152 G, 153 G, 152 R, 135, 137, 174/72 A, 151, 652, 654, 659, 665, 668, 174/558; 248/68.1, 49; 16/2.1, 2.2
See application file for complete search history.

(56) References Cited

U.S. PATENT DOCUMENTS 4,626,620 A * 12/1986 Plyler .................... H02G 3/083
                                                  174/153 G
4,656,689 A *  4/1987 Dennis ..................... F16L 5/10
                                                  174/153 G (Continued)

FOREIGN PATENT DOCUMENTS

CN     103166153 A     6/2013
JP     H07-065661 A    3/1995

(Continued)

OTHER PUBLICATIONS

International Search Report and Written Opinion mailed Oct. 11, 2023 in connection with International Application No. PCT/US2023/025143.

(Continued)

*Primary Examiner* — Angel R Estrada
(74) *Attorney, Agent, or Firm* — Wolf, Greenfield & Sacks, P.C.

(57) ABSTRACT

Support structures and methods for securing at least one element, such as a wire or bundle of wires, in an opening of a panel or other structure. A support assembly may comprise a grommet having an opening to accommodate the at least one element and a bushing configured to clamp around an outer surface of the grommet. The bushing may comprise one or more petals configured to contact a first surface of the structure and one or more snaps configured to contact a second surface of the structure that is opposite to the first surface.

29 Claims, 18 Drawing Sheets

(56) References Cited

U.S. PATENT DOCUMENTS

| | | | | |
|---|---|---|---|---|
| 5,504,973 | A | * | 4/1996 | Kameyama ............... H02G 3/22 |
| | | | | 174/153 G |
| 5,736,677 | A | * | 4/1998 | Sato ......................... H02G 3/22 |
| | | | | 174/152 G |
| 5,836,048 | A | * | 11/1998 | Rossman ............... H02G 3/083 |
| | | | | 16/2.2 |
| 6,010,134 | A | * | 1/2000 | Katoh ................. B60R 16/0222 |
| | | | | 174/152 G |
| 6,119,305 | A | * | 9/2000 | Loveall ............... H05K 9/0018 |
| | | | | 174/152 G |
| 6,438,828 | B1 | * | 8/2002 | Uchiyama ............. H02G 3/088 |
| | | | | 174/152 G |
| 6,467,734 | B1 | | 10/2002 | Brown et al. |
| 7,534,965 | B1 | * | 5/2009 | Thompson ............... H02G 3/22 |
| | | | | 174/152 G |
| 7,582,836 | B2 | * | 9/2009 | Tapper ................... H02G 3/083 |
| | | | | 174/152 G |
| 8,261,409 | B2 | | 9/2012 | Magennis et al. |
| 9,024,195 | B2 | * | 5/2015 | Clothier ................ H02G 3/083 |
| | | | | 174/152 G |
| 10,422,427 | B2 | * | 9/2019 | Beele ....................... H02G 3/22 |

| | | |
|---|---|---|
| 2013/0106060 A1 | 5/2013 | Beele |
| 2020/0408334 A1 | 12/2020 | Proulx et al. |
| 2021/0028609 A1 | 1/2021 | Robertson et al. |

FOREIGN PATENT DOCUMENTS

| | | |
|---|---|---|
| JP | H11-234864 A | 8/1999 |
| JP | 2009-219259 A | 9/2009 |

OTHER PUBLICATIONS

[No Author Listed], Flame-rated Gray Tube Isolator Insert. HoldRite. SKU 424. 2023, 4 pages. URL:https://www.holdrite.com/product/424 [last accessed May 11, 2023].

[No Author Listed], Stud-Mount Routing Supports. McMaster-Carr. 2023, 1 page. URL:https://www.mcmaster.com/pipe-hangers/stud-mount-routing-supports-5 [last accessed May 11, 2023].

[No Author Listed], Flame-rated Tube Isolator Insert. HoldRite. SKU 405-R. 2023, 4 pages. URL:https://www.holdrite.com/product/405-r [last accessed May 11, 2023].

Laflamme et al., Hinged Bushing, U.S. Appl. No. 29/885,942, filed Mar. 2, 2023.

* cited by examiner

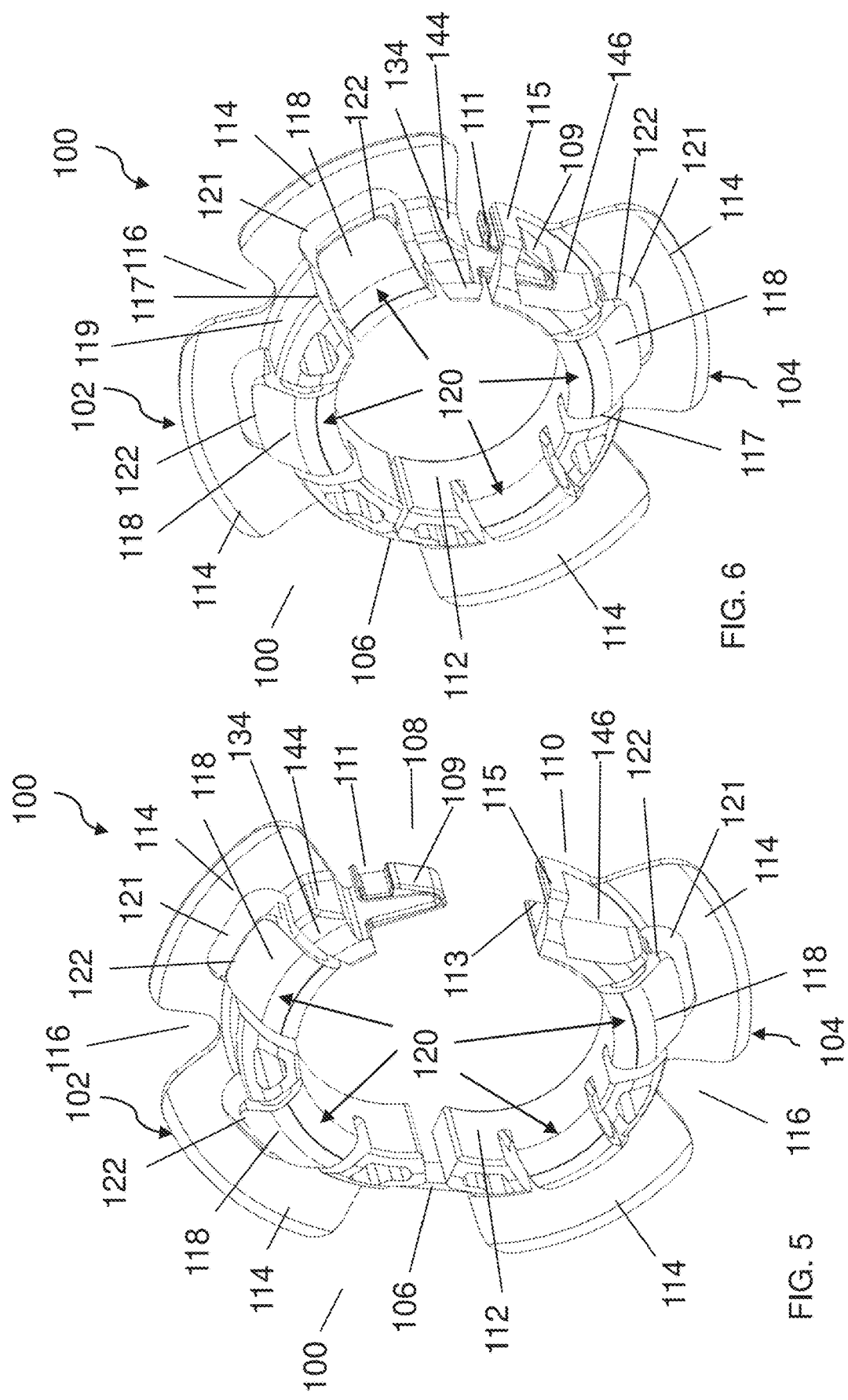

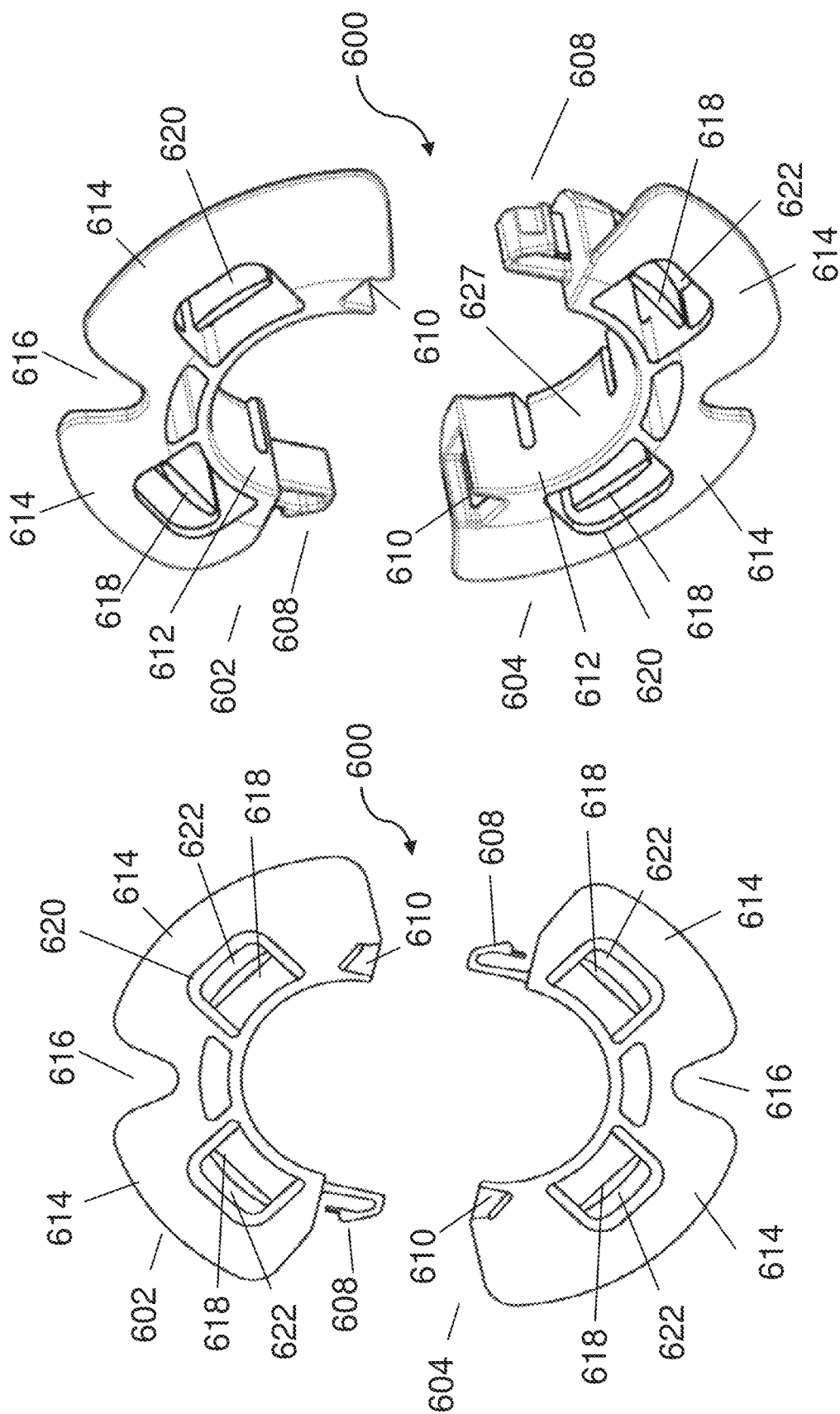

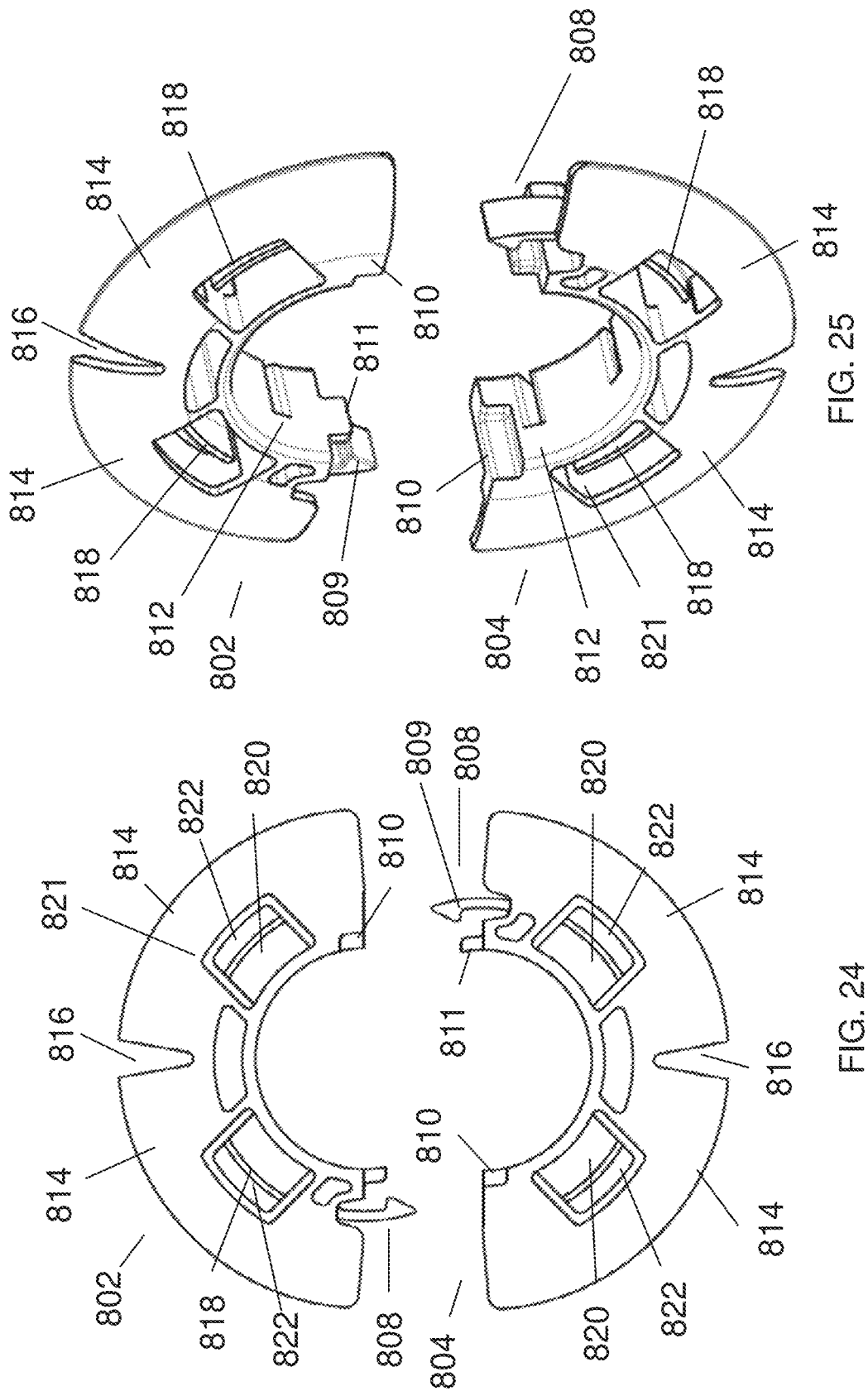

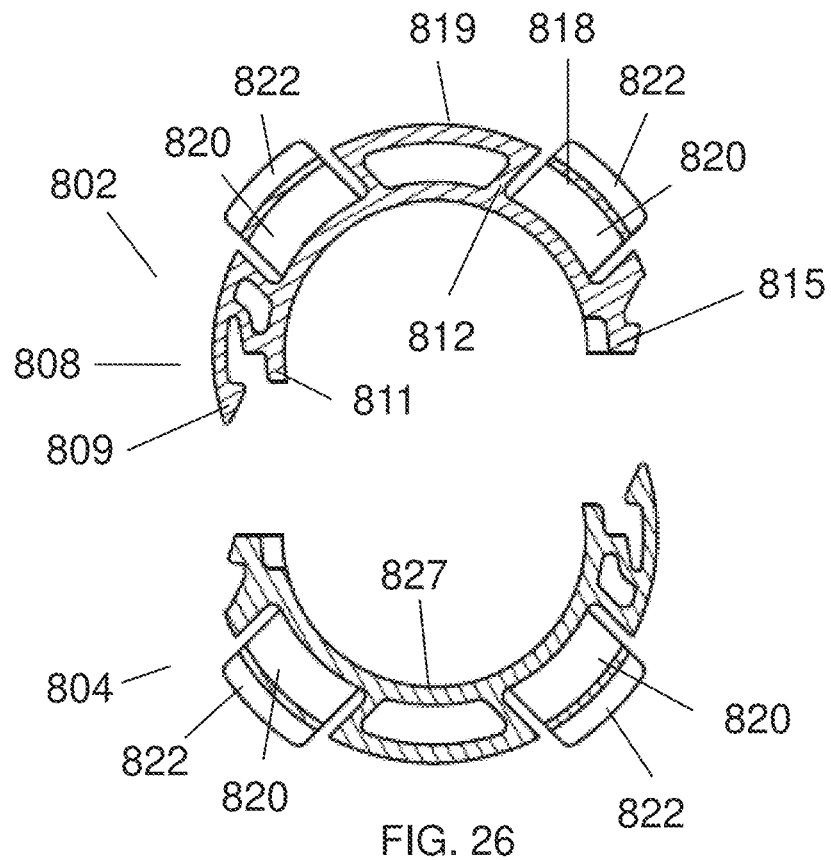
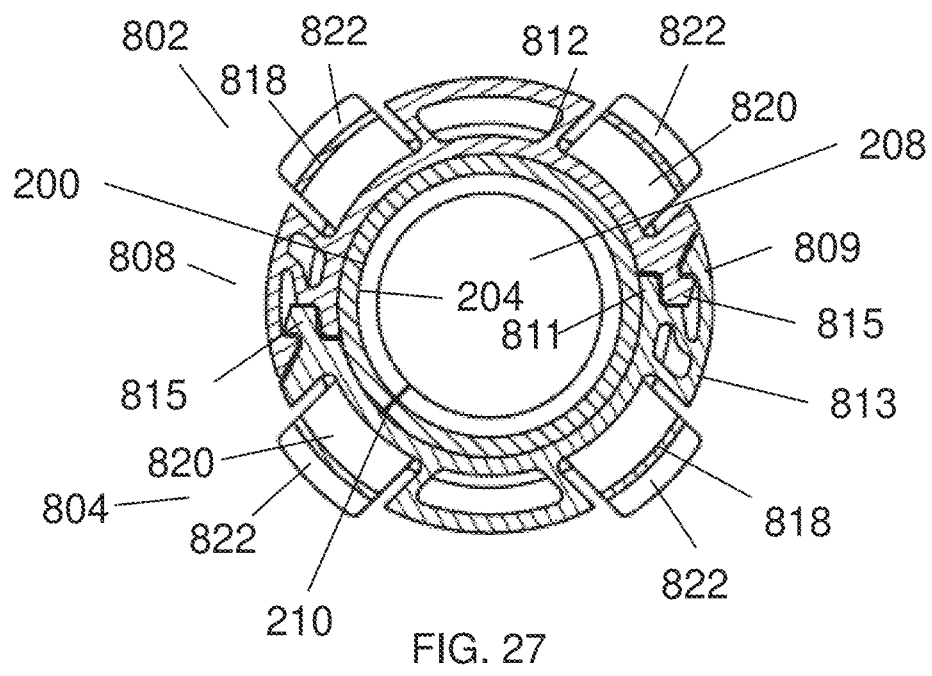
FIG. 26
FIG. 27

METHODS AND APPARATUS FOR SUPPORTING WIRES IN OPENINGS

CROSS-REFERENCE TO RELATED APPLICATIONS

This application claims the benefit, under 35 U.S.C. § 119(e), of U.S. Provisional Application Ser. No. 63/352,104, entitled "METHODS AND APPARATUS FOR SUPPORTING WIRES IN OPENINGS," filed on Jun. 14, 2022, which is hereby incorporated herein by reference in its entirety.

FIELD

Disclosed embodiments relate to methods and apparatus for supporting elements, such as wires, in openings in panels or other structures.

BACKGROUND

When manufacturing large structures, such as aircraft, electrical wires pass through openings in interior structures, such as panels or walls. Over time, the wires may chafe against the openings, causing damage to the wires or abrasion of their insulation. Exposed wires may make electrical contact with the structures they pass through, resulting in hazardous wiring failures.

SUMMARY

Disclosed herein are methods and apparatus for securing at least one element in an opening of a structure, such as a panel or wall.

For example, a support assembly is provided for securing at least one element in an opening of a structure having first and second opposing surfaces. The support assembly comprises a grommet having an opening to accommodate the at least one element and a bushing configured to clamp around an outer surface of the grommet. The bushing comprises one or more petals configured to contact the first surface of the structure and one or more snaps configured to contact the second surface of the structure.

A method is provided for securing at least one element in an opening of a structure having first and second opposing surfaces. The method comprises positioning a grommet around the at least one element, securing a bushing around the grommet, and moving the bushing into the opening of the structure so as to engage one or more petals extending radially from the bushing with the first surface of the structure and one or more snaps extending radially from the bushing with the second surface of the structure.

A bushing is provided that is configurable in an open configuration and a closed configuration. The bushing comprises a first member and a second member. The first member includes a male mating portion at a first end portion of the first member, the male member being configured to engage a female mating portion at a first end portion of the second member when the bushing in the closed configuration. Each of the first and second members comprises an inner portion, one or more petals that extend radially from a first side of the inner portion, and one or more snaps that extend from a second side of the inner portion.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 5 is a rear perspective view of the bushing of FIG. 3 in an open configuration, according to an embodiment;

FIG. 6 is a rear perspective view of the bushing of FIG. 3 in a closed configuration, according to an embodiment;

FIG. 18 is a front view of a bushing in an open configuration, according to an embodiment;

FIG. 19 is a front right perspective view of the bushing of FIG. 18 in an open configuration, according to an embodiment;

FIG. 24 is a front view of a bushing in an open configuration, according to an embodiment;

FIG. 25 is a front right perspective view of the bushing of FIG. 24 in an open configuration, according to an embodiment;

FIG. 26 is a front cross-sectional schematic of the bushing of FIG. 24 in an open configuration, according to an embodiment;

FIG. 27 is a front cross-sectional schematic of the bushing of FIG. 24 in a closed configuration with a grommet, according to an embodiment;

DETAILED DESCRIPTION

Figure 1:
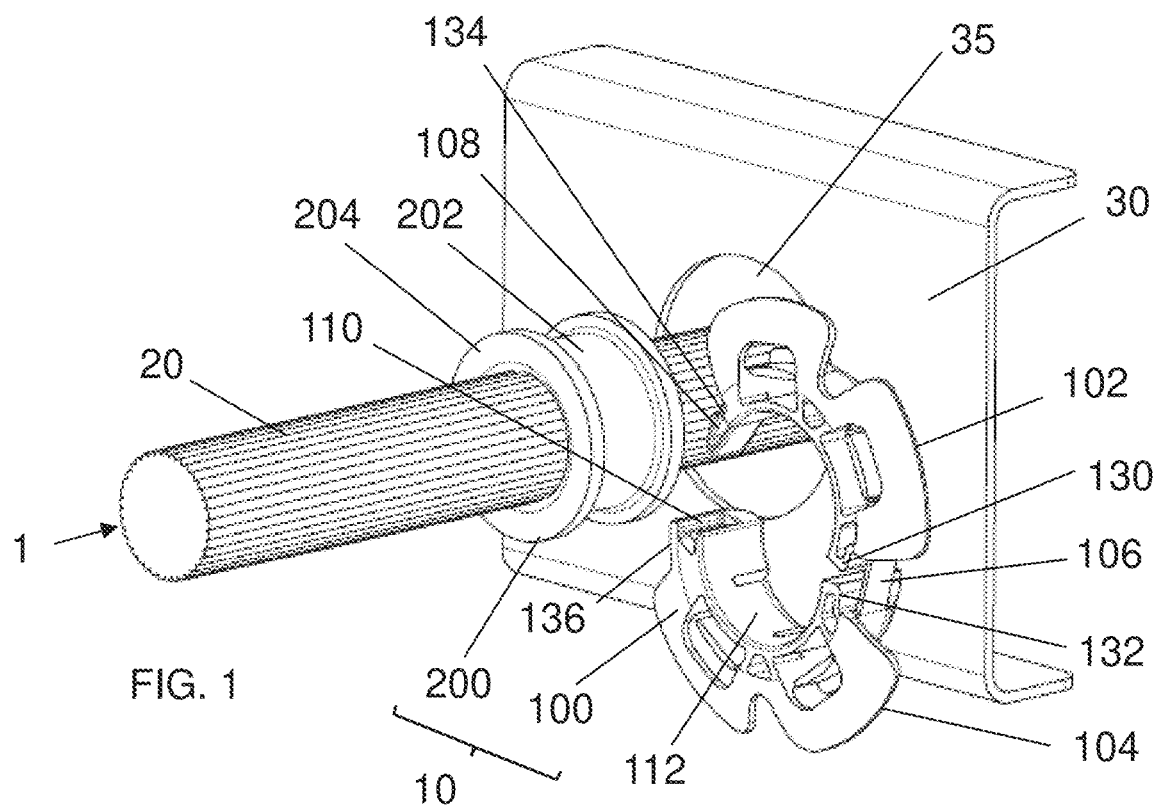
FIG. 1 illustrates a support assembly, according to an embodiment.

To alleviate the stress on wires passing through openings, various techniques for supporting wires have been proposed. One conventional technique involves placing a caterpillar grommet around the circumference of an opening and installing a cable support, bracket, and rivets to secure the bundle of wires to a periphery of the opening. With multiple parts, the assembly is complex and time consuming to install. Other techniques require a bushing to be placed around a wire bundle by inserting an end of the bundle into an opening of the bushing and pulling the bundle through the opening until the bushing is properly positioned. This process is time consuming and cumbersome.

The inventors have recognized and appreciated a need for a structure that is easy to manufacture and install, yet suitably supports wires or other elements. Accordingly, some embodiments provide a support assembly that includes a bushing and a grommet that cooperate to support one or more elements, such as a wire bundle, within an opening of a structure. The support assembly may assist in aligning, stabilizing, and securing one or more elements within the opening. The bushing and/or grommet may be configured to facilitate placement on the wire bundle at any location along its length, without the need to be threaded from an end of the bundle.

The grommet may be sized and shaped to accommodate the one or more elements within one or more openings therein. Grommets with openings of various sizes may be used with the same bushing, providing flexibility. According to one embodiment, the grommet is circular in shape with a single central circular opening. According to another embodiment, the grommet has an obround or stadium shape with a plurality of openings. However, various alternative grommet shapes are possible, such as oval or square, and various numbers of openings may be included, such as one, two, three or more. The grommet may include a radial slit associated with each opening and be formed of a flexible material to allow elements to be introduced into an opening of the grommet without the need to thread elements through the opening. The grommet may include a pair of opposing flanges to restrict movement of a bushing secured around the periphery of the grommet.

The bushing may have an opening that corresponds in shape and size to the shape and size of a periphery of the grommet so as to accommodate the grommet within the opening. Further, the bushing may have open and closed configurations to allow the bushing to be placed around the grommet in an open configuration and then closed to secure to the grommet. The bushing may include at least one closure mechanism that is open in the open configuration and closed in the closed configuration. The closure mechanism may include a male mating portion (e.g., a latch) and a female mating portion (e.g., a housing), which may be latched to close the bushing and unlatched to open the bushing. The bushing may include two members, each forming a portion (e.g., half) of the circumference of the bushing. According to one embodiment, the bushing includes a hinge disposed opposite to the closure mechanism so that the members pivot about the hinge when moving the bushing between open and closed configurations. According to another embodiment, the members are unattached in the open configuration and joined in the closed configuration. In this embodiment, a pair of opposing closure mechanisms may be used to join the members in the closed configuration. For ease of manufacture, the two members of the bushing may be identical, each comprising a male mating portion (e.g., a latch) and a female mating portion (e.g., a housing).

The inventors have further appreciated designs for a versatile support assembly that may be used with structures having different thicknesses and openings of different shapes and sizes. In some embodiments, the bushing may include one more petals that contact a first surface of the structure (e.g., a front side of a wall) and one or more snaps that contact a second surface of the structure that is opposite the first surface (e.g., a rear side of the wall). The petals and snaps may be flexible and may provide opposing forces to stabilize and secure the support assembly within various openings of structures of different thicknesses. Different bushings may be combined with grommets having various thicknesses to secure wires of varying thicknesses within the opening, centering the wires within the opening regardless of the diameter of the wires and/or the opening.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2:
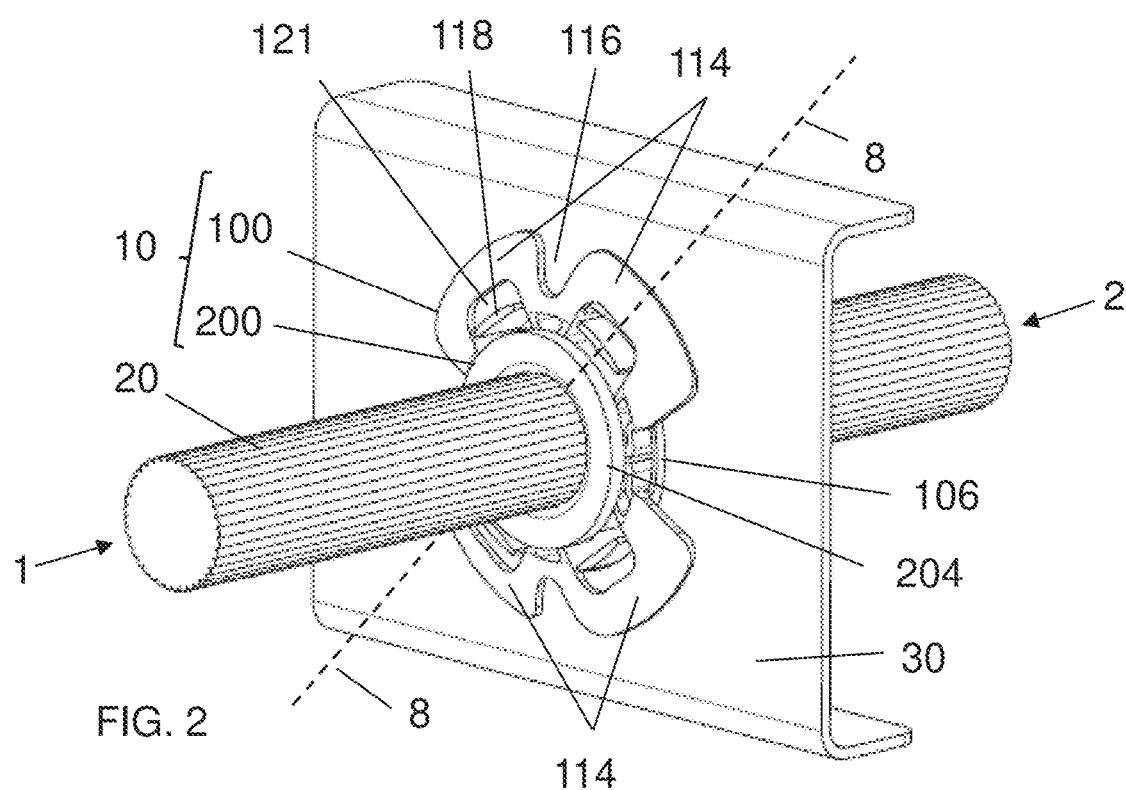
FIG. 2 illustrates the support assembly of FIG. 1 installed in an opening according to an embodiment.

FIGS. 1 and 2 illustrate a support assembly 10 according to one embodiment. The support assembly 10 includes a grommet 200 and a bushing 100 configured to encircle an outer surface 202 of the grommet 200. FIG. 1 illustrates the support assembly 10 partially installed in an opening 35 of a structure 30 (e.g., wall) to secure one or more wires 20 in the opening and FIG. 2 illustrates the support assembly installed in the opening 35 with wires 20. Wires 20 may comprise individual wires, a bundle of wires or a cable. Alternatively, the support assembly 10 may be used to support one or more other elements, such as optical fibers.

The bushing 100 may be moved between an open configuration, shown in FIG. 1, and a closed configuration, shown in FIG. 2. To facilitate this movement, the bushing 100 includes a hinge 106 that moveably couples first and second members 102, 104. The hinge 106 may be a flexible strip of material that extends between first end portions 130, 132 of the first and second members 102, 104, respectively, such that seconds ends 134, 136 of the first and second members 102, 104, respectively, may move relative to each other. For example, with reference to the view of FIG. 1, the first member 102 may pivot clockwise about hinge 106, while the second member 104 may pivot counterclockwise about the hinge 106. In some embodiments, the first member 102 may include a latch 108 at second end portion 134 configured to engage a housing 110 in the second end portion 136 of the second member 104 to secure the bushing 100 in a closed configuration.

To configure the support assembly 10 as shown in FIG. 2, the second end portions 134, 136 of the first and second members 102, 104 may be pivoted away from each other via hinge 106 a sufficient distance to position the first and second members 102, 104 around an outer surface 202 of grommet 200. The second end portions 134, 136 may then be moved toward each other around grommet 200 until the latch 108 engages the housing 110.

In some embodiments, when in a closed configuration, curved inner portions 112 of the first and second members 102, 104 may cooperate to form a partial or complete ring with a curved inner surface 127 that is shaped and sized to fit around the outer surface 202 of grommet 200. In some embodiments, the grommet 200 may be tubular in shape and include flanges 204 that extend radially outward from one or both ends of the grommet 200. A width of the inner portion 112 of the bushing 100 may complement the width of surface 202 such that the bushing 100 is held securely between the flanges 204 of the grommet 200. In some embodiments, an outer diameter of the grommet 200 may be less than a diameter of opening 35.

Once the bushing 100 has been closed around the grommet 200, the support assembly 10 may be mounted within opening 35 of structure 30 by moving the support assembly 10 in a first direction 1 along a central longitudinal axis of the bundle of wires towards the opening 35. FIG. 2 illustrates the support assembly 10 mounted within the opening 35, according to one embodiment. As shown, bushing 100 may be positioned around the outer surface 202 of the grommet between flanges 204. The support assembly 10, when mounted in opening 35, may center the bundle of wires 20 within the opening 35. The bushing 100 may include one or more petals 114 that contact a surface of structure 30, as will be described. In some embodiments, the support assembly may be mounted in an opening 35 that may have a diameter of approximately 1.5 inches in a structure that may have a thickness of approximately 0.05 to approximately 0.07 inches; however, the support assembly may be configured to be mounted into openings of various diameters and in structures of various thicknesses, as the disclosure is not so limited. The structure may be, for example, a wall or panel and may have opposing surfaces (e.g., front and rear) that are parallel or non-parallel.

Figure 3:
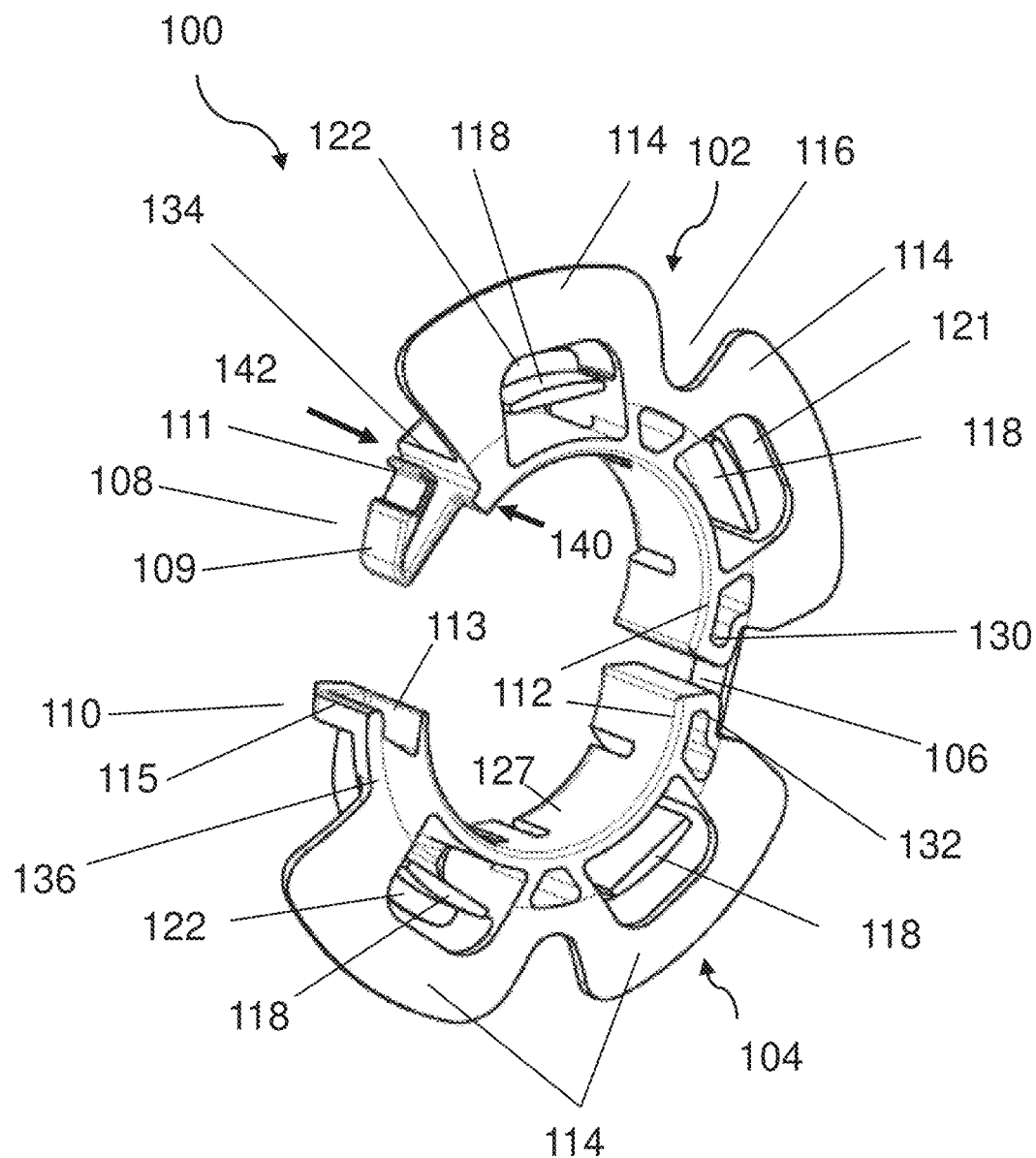
FIG. 3 is a front left perspective view of a bushing in an open configuration, according to one embodiment.

FIGS. 3-6 illustrate the bushing 100 of FIGS. 1 and 2. FIGS. 3 and 4A are front perspective views of bushing 100 in open and closed configurations, respectively; FIG. 4B is a cross-sectional view of the bushing 100 taken along line 4-4 of FIG. 4A, and FIGS. 5-6 are back perspective views of the bushing 100 in open and closed configurations, respectively. In this exemplary embodiment, one or more petals 114 extend radially outward from a first side 140 of the bushing 100. In some embodiments, the first and second members 102, 104 each include two petals 114 separated by notch 116. The notch 116 may extend partially or completely toward an outer surface 119 of the inner portions 112. As shown in FIG. 2, the petals 114 may be sized and shaped such that an end portion of the petal 114 contacts a first surface of the structure 30 to prevent the support assembly from moving further in the first direction 1 through the opening. In some embodiments, the petal 114 may be formed of a flexible material such that the petals may bend toward or away from the first and second sides 140, 142 of the bushing.

Figure 4A:
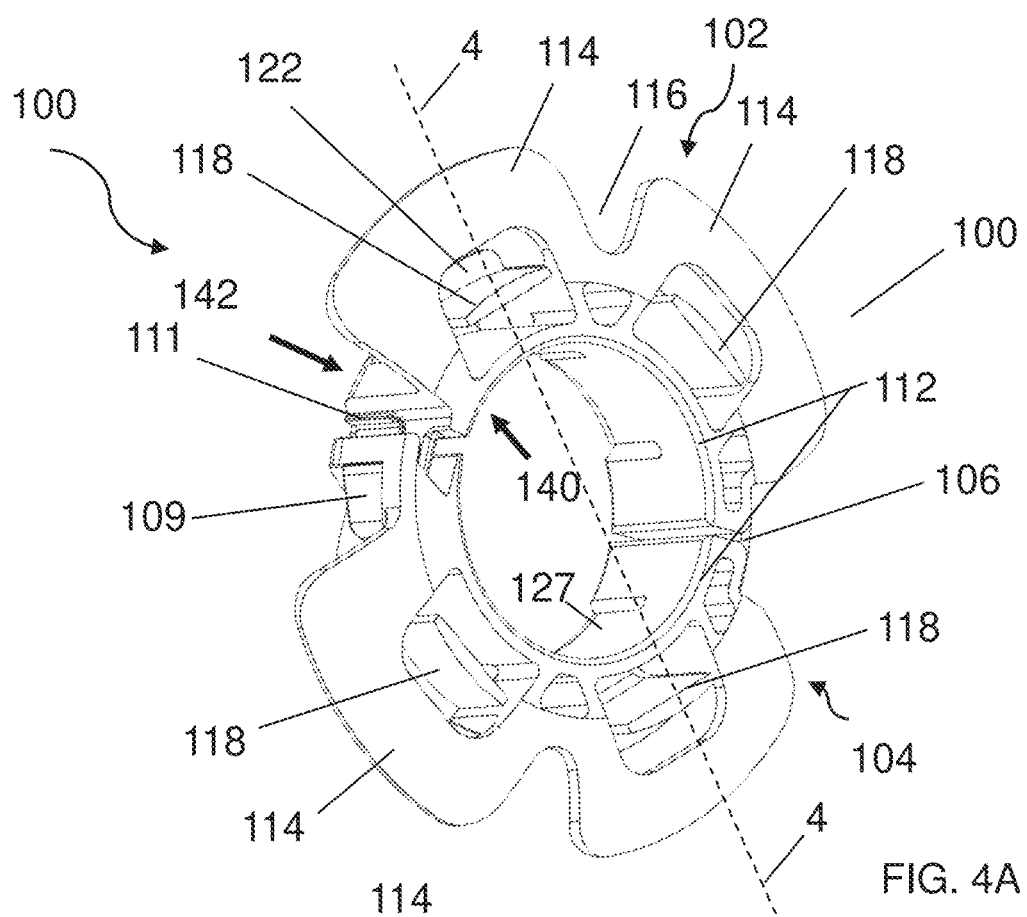
FIG. 4A is the bushing of FIG. 3 in a closed configuration, according to an embodiment.
Figure 4B:
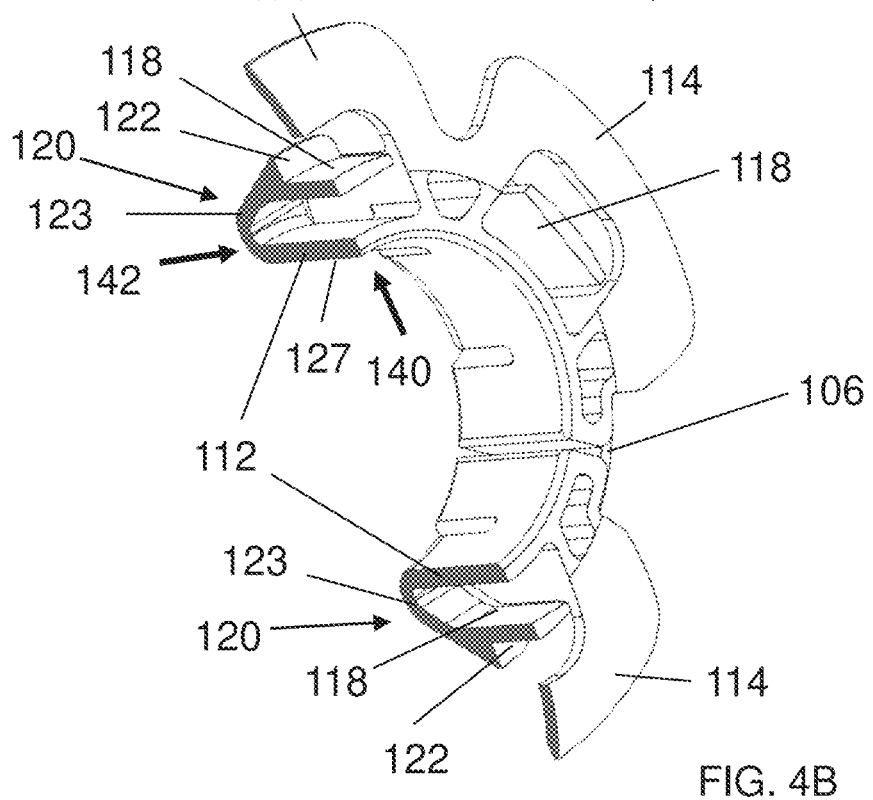
FIG. 4B is a cross-sectional view of the bushing of FIG. 4A taken along line 4-4.

In this exemplary embodiment, the bushing 100 includes one or more snaps 120 within gaps 117 of the inner portions 112. As shown in FIG. 4B, the snaps 120 may include, at a first end, a curved, or U-shaped portion 123 that extends from the second side 142 of an inner surface 127 of the inner portion 112. A second end 118 of the snap 120 may be a free end that extends parallel to the inner surface 127 of inner portion 112 in a direction toward the first side 140 of the bushing 100. An outer surface of free end 118 may have a curvature similar to the curvature of the outer surface 119 of the inner portion 112. The second end 118 may extend through an opening 121 of a petal 114. In some embodiments, the second end 118 of snap 120 may extend a distance equal to, less than, or greater than the first side of the inner portion 112. In some embodiments, the second end 118 extends past a plane of the first side of the inner portion 112. In some embodiments, each snap 120 may include a ridge 122 that extends radially outward from an outer surface of second end 118. The ridge 122 may have a surface that is perpendicular to and may form a right angle with the outer surface of second end 118. The disclosure is not so limited and the ridge 122 may form other angles with the outer surface 118. The ridge 122 may be arranged on the second end 118 to create a distance between the ridge and a surface of petal 114 facing the second side 142 of bushing 100.

In some embodiments, the snaps 120 may be made of a flexible material such that the second end 118 may flex or bend in a direction away or toward the inner portion 112. The openings 121 of petals 114 may provide access to the second ends 118 from the first side 140 of the bushing, allowing a user to apply a force to and flex the second ends 118 from the first side. The opening 121 may be sized such that the second end 118 may fit through the opening and flex within the opening.

As shown in FIGS. 3-6, in some embodiments, the second end portion 134 of first member 102 may include a latch 108 to engage a housing 110 in the second end portion 136 of second member 104. The description is not so limited, however, and the latch 108 and housing 110 may be on either the first or second member, or any latching connection may be used that may secure the first and second members in a closed configuration. As shown in the FIGS. 3, 4 and 5-6, in some embodiments the latch 108 includes a U-shaped arm 109 and an L-shaped arm 111 that extends from the U-shaped arm 109. The arm 111 may have a thickness less than a thickness of the U-shaped portion, forming a ridge between the U-shaped portion and the end of the arm 111.

In some embodiments, when moving the bushing 100 from an open configuration to a closed configuration, the U-shaped arm 109 may enter a channel 113 of the housing 110 and compress against wall 115, causing the U-shaped arm 109 to flex radially inward. Once the U-shaped arm 109 passes by the wall 115, the latch 108 may spring back to its original position, and the arm 111 may engage the wall 115 to secure the bushing 100 in the closed configuration (FIGS. 4A and 6).

As shown in FIGS. 5 and 6, the first end 134 of member 102 may include a first cutout 144 in the inner portion 112. The cutout 144 allows a user to access the arm 111 to disengage the latch 108 and move the bushing to an open configuration. A user may press the arm 111 radially inward to disengage the arm 111 from wall 115 and allow the U-shape arm 109 to be removed from the channel 113.

In some embodiments, the housing 110 on the second member may include a second cutout 146 that provides access to the U-shaped arm 109 while engaged with the housing (see FIG. 6). A user may press the U-shaped arm 109 radially inward to compress the U-shaped portion and disengage the latch from the housing. Accordingly, first and second cutouts 144, 146 provide easy, accessible unlatching of the bushing.

Figure 7A:
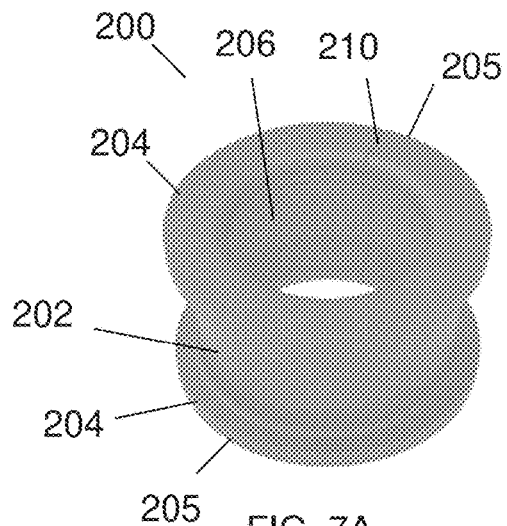
FIG. 7A is a perspective view of a grommet, according to an embodiment.
Figure 7B:
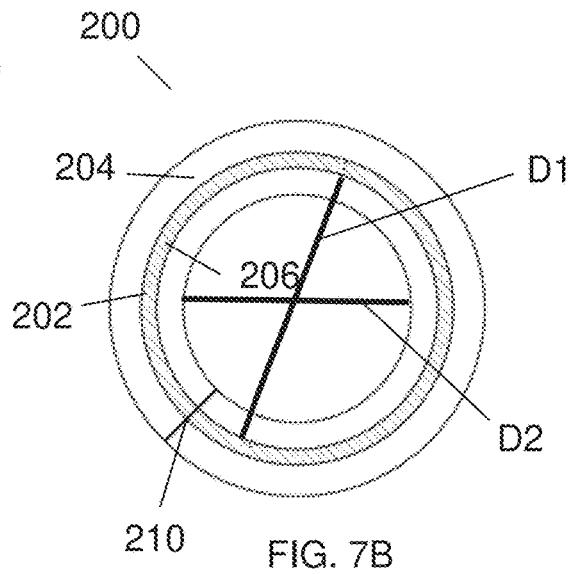
FIG. 7B is a cross-sectional schematic of the grommet of FIG. 7A.

FIG. 7A is a perspective view of grommet 200 according to an embodiment and FIG. 7B is a cross-sectional schematic of the grommet of FIG. 7A. In some embodiments, the grommet 200 may be tubular in shape and have a middle portion 206 and flanges 204 that extend radially outward at end portions 205 of the grommet. As discussed above with respect to FIG. 1, the bushing 100 may be shaped and sized to be arranged around the outer surface 202 of grommet 200 between flanges 204. In some embodiments, the grommet 200 may include a radial slit 210 that extends the entire length of the grommet between both end portions 205. The slit may allow grommet 200 to be opened and positioned around one more wires or other elements. In some embodiments, the grommet 200 may be made of a flexible or compressible material, such as a chloroprene rubber (e.g., AMS3209) or other rubber. When the bushing 100 is secured around the grommet in a closed configuration, the bushing 100 supports the grommet 200 such that the grommet does not separate at the slit 210.

The grommets and bushings disclosed herein may include different profiles and/or diameters to accommodate elements of different diameters and functions. In some embodiments, a width or diameter of the outer surface of the grommet may be greater than or equal to 0.5 inches, 0.75 inches, 1.0 inch, 1.25 inches, and/or any other appropriate diameter. In some embodiments, a width or diameter of the outer surface of the grommet may be less than or equal to 2 inches, 1.75 inches, 1.25 inches, 1 inch, and/or any other appropriate dimension. Combinations of the foregoing are contemplated including, for example, a width or diameter of the outer surface of the grommet that is between or equal to 1.0 and 1.75 inches, and/or any other appropriate combination of the foregoing. In some embodiments, a width or diameter of the inner portion 112 of the bushing 100 may be greater than or equal to 1.0 inch, 1.25 inches, 1.5 inches, 1.75 inches, 2 inches, and/or any other appropriate diameter. In some embodiments, a width or diameter of the inner portion 112 of the bushing 100 may be less than or equal to 3.25 inches, 3.0 inches, 2.5 inches, 2.25 inches, 1.75 inches, and/or any other appropriate dimension. Combinations of the foregoing are contemplated including, for example, a width or diameter that is between or equal to 1.25 and 2 inches, and/or any other appropriate combination of the foregoing. While specific ranges for the widths and diameters are provided above, it should be understood that ranges both greater than and less than those noted above are also contemplated as the disclosure is not so limited.

Figure 7C:
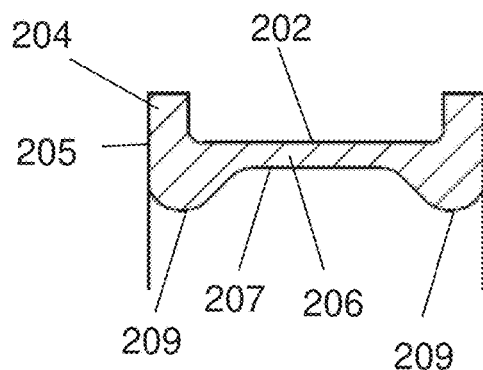
FIG. 7C is a cross-sectional schematic of a portion of a grommet, according to an embodiment.
Figure 7D:
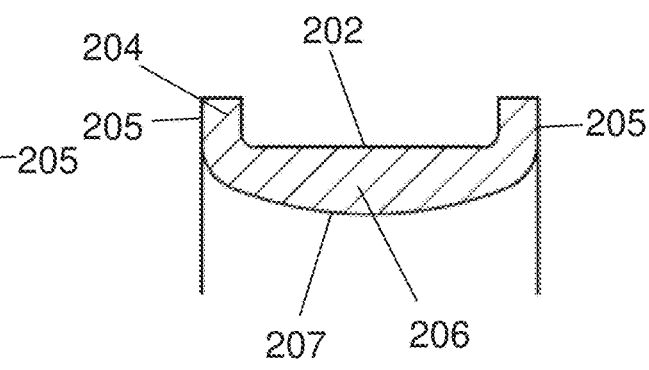
FIG. 7D is a cross-sectional schematic of a portion of a grommet, according to an embodiment.

FIGS. 7C-7D illustrate cross-sectional schematic views of a wall of the grommet according to different embodiments. As shown in FIG. 7C, in some embodiments, the grommet 200 may include a middle portion 206 that has an inner diameter D1 that is greater than an inner diameter D2 at of the grommet at the end portions 205 (see FIG. 7B). In such embodiments, the grommet 200 may include bumps 209 on an inner surface 207 of the grommet positioned at each end portion 205. The bumps 209 may be compressible such that the grommet may accommodate wire bundles or other elements of different diameters. As shown in FIG. 7D, in some embodiments, the grommet 200 may include a middle section 206 that increases in thickness as it moves away from the end portions 205. The inner surface may curve such that the inner surface 207 is a convex surface. In some embodiments, the middle portion 206 may be compressible to accommodate wire bundles or other elements of different diameters.

Figure 8A:
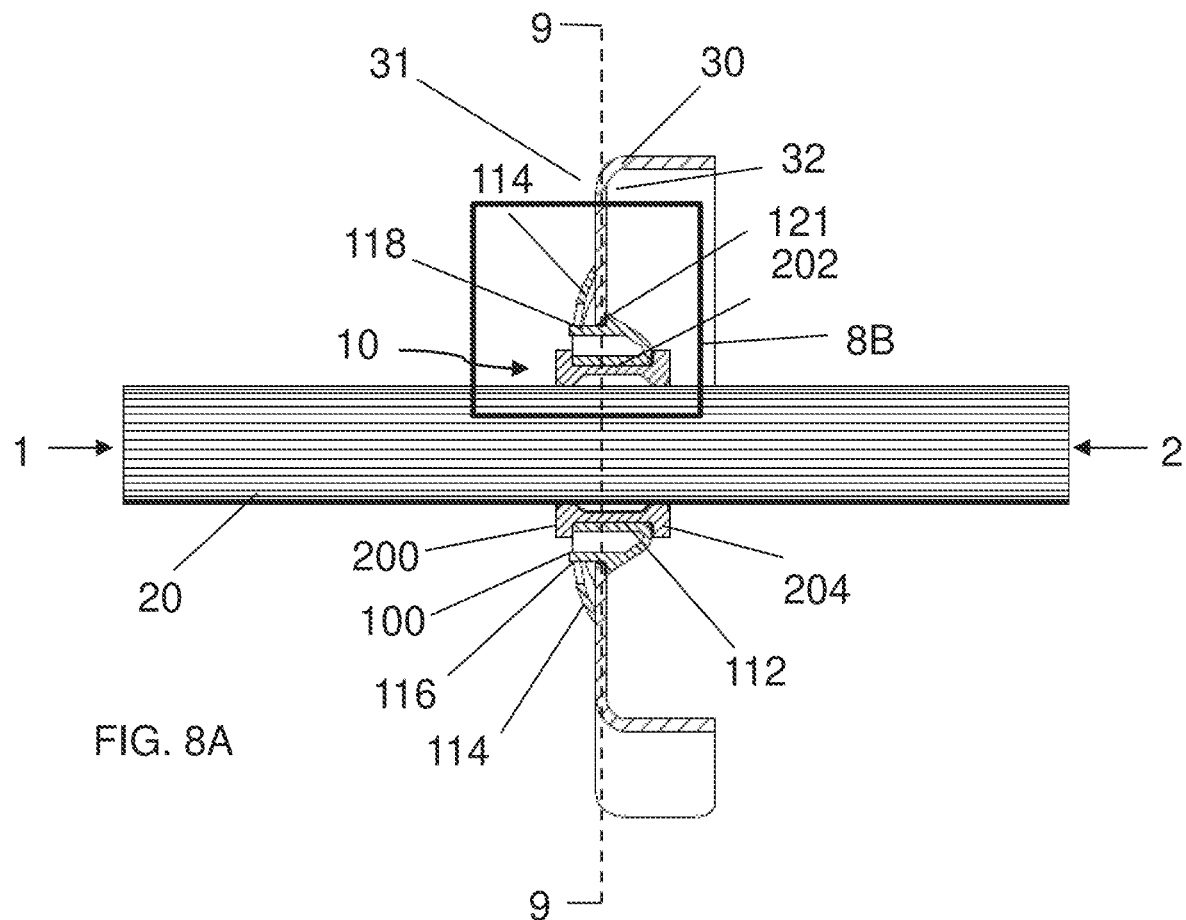
FIG. 8A is a side cross-sectional view of the support assembly of FIG. 2 taken along line 8-8.
Figure 8B:
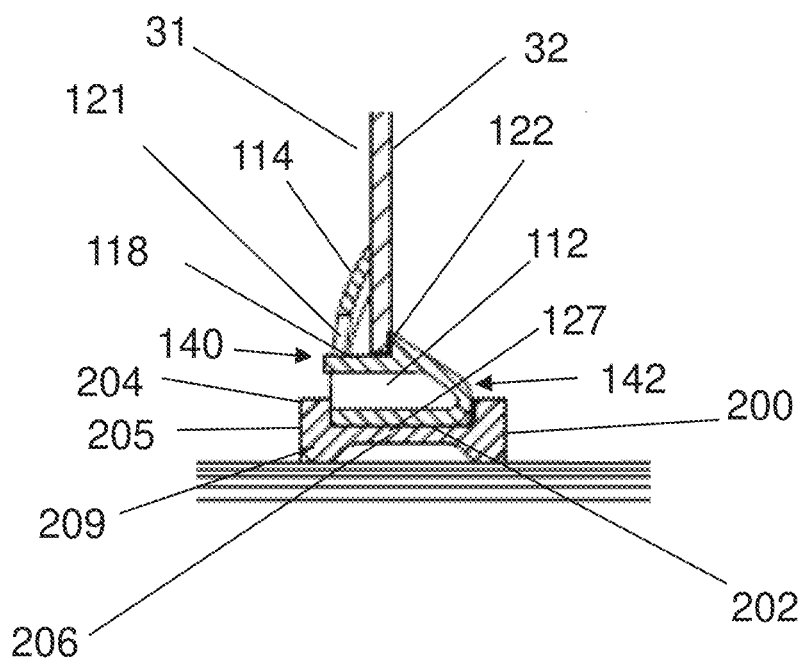
FIG. 8B is an enlarged view of the box 8B of FIG. 8A.
Figure 9:
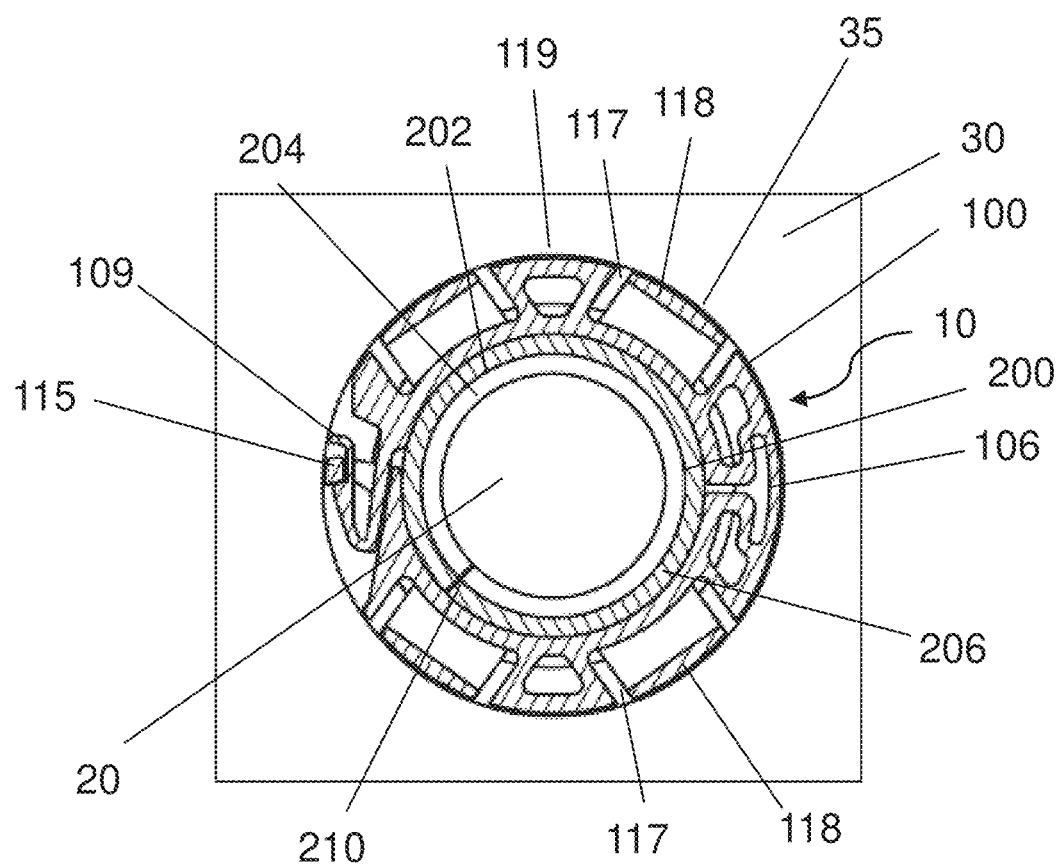
FIG. 9 is a front cross-sectional view of the support assembly of FIG. 8A taken along line 9-9.

FIG. 8A shows a side cross-sectional view of the installed support assembly 10 of FIG. 2 taken along line 8-8; FIG. 8B is an enlarged view of box 8B of FIG. 8A; and FIG. 9 is a front cross-sectional view of the support assembly taken along line 9-9 of FIG. 8A. As shown in the figures, the grommet 200 is positioned around a bundle of wires 20 and the bushing 100 is positioned, in a closed configuration, around the grommet 200, as described above. As shown, the inner surface 127 of the inner portion 112 of the bushing 100 fits between flanges 204 adjacent to the outer surface 202 of the grommet 200. This fit prevents the bushing 100 from sliding relative to the grommet in either direction along the length of the bundle of wires 20.

As described above, in some embodiments, the grommet 200 may have a middle section 206 that has an inner diameter D1 that is less than an inner diameter D2 at the end portions 205 (see FIG. 7B). Accordingly, the grommet may contact the bundle of wires 20 only at the end portions, leaving a gap between the wires 20 and the middle portion 206 of the grommet. In some embodiments, the grommet may secure the wires in the opening to prevent unwanted movement in the radial direction with respect to the opening or in a longitudinal direction, such that the wires may not be pulled through the opening. In some embodiments, the grommet 200 may restrain the wires in the radial direction but not in the longitudinal direction, allowing the wires 20 to be pulled through the grommet in either longitudinal direction. As such, the support assembly 10 may secure the radial position of the wires within the opening while still allowing the wires to be pulled in a longitudinal direction through the opening without the support assembly being pulled out of the opening. In some embodiments, the grommet 200 may have other cross-sectional shapes, including but not limited to flat, concave, or convex inner surfaces, as the disclosure is not so limited.

In some embodiments, a surface of the grommet 200 limits inwards deflection of the snaps 120 of the bushing 100 to reinforce the snaps and prevent unwanted removal of the support assembly 10. For example, if a force is applied in the second direction 2 (see FIGS. 1-2), the U-shaped portion 123 of the snap 120 (FIG. 4B) may press against a corner surface of the grommet between the flange 204 and the outer surface 202, countering the force applied and helping stabilize the bushing in the opening 35. In some embodiments, the ridges 122 may help prevent the bushing from being removed if a force is applied in the second direction. The ridges 122 may prevent the snaps from over-deflecting radially outward when such a force is applied.

As shown in FIGS. 8A-8B, in some embodiments, the petals 114 and/or snaps 120 may contact opposing surfaces of the structure 30 to retain the support assembly 10 within the opening 35. In some embodiments, as shown in FIGS. 8A-8B, an outer edge portion of each petal 114 may contact a first surface 31 of structure 30 to stabilize and prevent the support assembly 10 from moving in the first direction 1 along the longitudinal axis of the wire bundle 20. In some embodiments, the ridge 122 of each snap 120 may contact a second surface 32, opposite the first surface 31, of the structure 30 to stabilize and prevent the support assembly 10 from moving in a second direction 2, opposite the first direction 1, along the longitudinal axis of the wire bundle 20. Each petal 114 may be flexible and bend in toward either the first or second surface 140, 142 of the bushing to maintain pretension against the snap 120 and accommodate varying thicknesses of structure 30. In some embodiments, the notches 116 between petals 114 relieve hoop stress and allow the petals 114 to flex more easily.

In some embodiments, the outer surface of the second portion 118 of each snap 120 may contact the inner perimeter of opening 35 in structure (see also FIG. 9). In some embodiments, the bushing 100 may have varying shapes to accommodate openings with different shapes (e.g., circle, elliptical, square, etc.). In some embodiments, the bushing 100 may be sized to fit snuggly within the opening 35 to at least partially stabilize the bushing in the opening. As shown in FIG. 9, an outer surface 119 of the inner portion 112 and the outer surface of second end portions 118 of each snap 120 may form an outer perimeter that complements a shape and size of the opening 35.

As described above, to install the support assembly according to some embodiments, the grommet 200 is placed over the wire bundle 20, the bushing 100 is positioned over the grommet, and then the support assembly 10 is inserted into the opening 35. In some embodiments, the support assembly 10 is inserted into the opening from the second side 142 of the bushing. As the support assembly 10 is inserted into the opening 35, the edges of the structure around the opening contact an outer surface of each snap 120, pressing the snaps 120 radially inward. The second portions 118 compress inward until the ridge 122 passes through the opening, causing the snaps to flex back to an unloaded position in which the ridge 122 engages the edges of the structure 30 around opening 35. The petals 114 and the snaps 120, as described, apply opposing forces to maintain the support assembly in the opening.

To remove the support assembly 10 from the opening 35, the snaps 120 may be compressed radially inward to disengage the ridge 122 from the edges of structure 30. As shown in FIGS. 8A-8B, the second portion 118 of snaps 120 may extend through the openings 121 of petals 114 (see also FIG. 2). The openings 121 provides access to the second portion 118 so that a user may depress the second portion radially inward from the first side 140 of the bushing 100 to disengage the ridge 122 of the snap from the structure surface to unlatch the snap 120 from the structure 30. As such, the support assembly 10 may be removed from the opening by moving the support assembly in a second direction 2 toward the front side 140 of the bushing 100. In some embodiments, the windows 121 may also allow for ease of manufacturing by allowing molding of the snaps while molding in a direction from the first side 140 to the second side 142.

In some embodiments, a user may also access the snaps from the second side 142 of the bushing. With reference to FIGS. 1-2 and 4B, a user may press the U-shaped portion 123 (FIG. 4B) from the second side 142 of the bushing 100 to disengage the ridge 122 from the structure 30 (FIGS. 1-2). Accordingly, the support assembly 10 may allow for a simple way to securely maintain a bundle of wires in structures of different thicknesses while also providing flexibility in adjusting wires through the bushing as well as quickly uninstalling and/or repositioning the support assembly from either side of the structure.

Figure 10A:
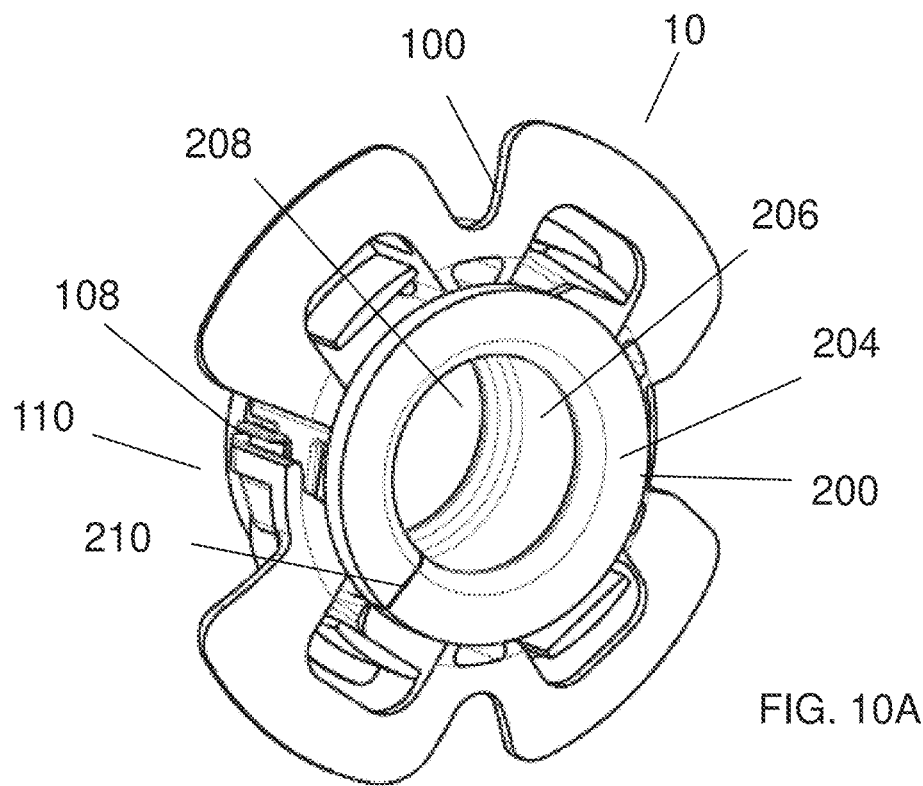
FIG. 10A is a perspective view of a bushing and a grommet, according to an embodiment.
Figure 10B:
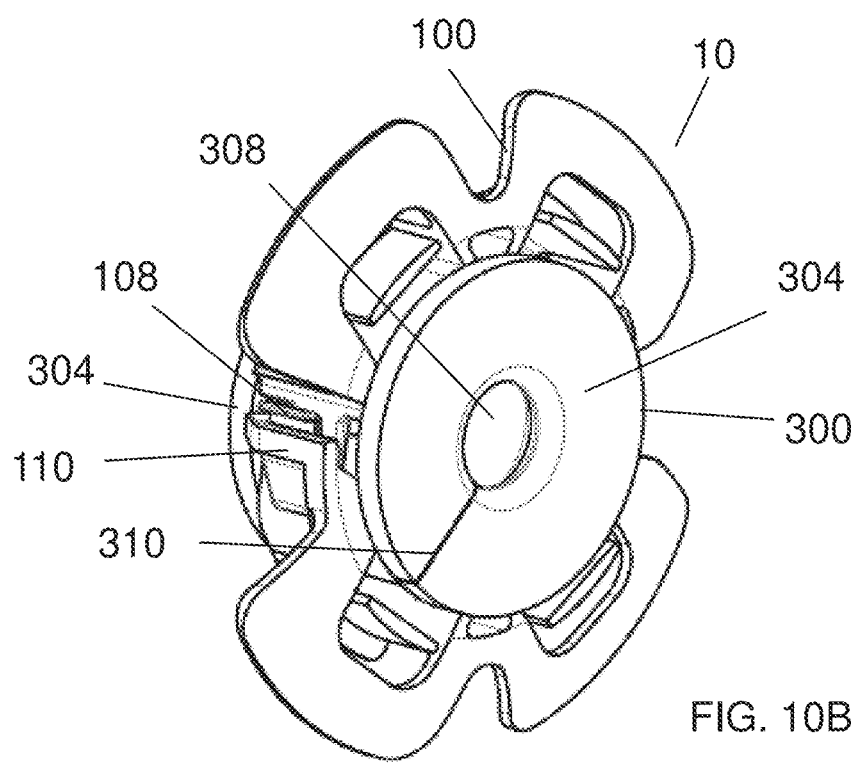
FIG. 10B is a perspective view of a bushing and a grommet, according to an embodiment.

As shown in FIGS. 10A-10B, the inner diameter of the grommet of the support assembly may vary to accommodate elements of different diameters. In FIG. 10A, a bushing 100 is positioned in a closed configuration around a grommet 200. The bushing 100 is arranged on an outer surface of the grommet between flanges 204. As shown, the latch 108 of the bushing is engaged with the housing 110 to secure the bushing around the grommet. The grommet 200 has an opening 208 through which a bundle of wires may extend through. In some embodiments, the grommet includes a slit through a length of the wall of the tubular body to allow the grommet to be opened to position the grommet around a bundle of wires. Of course, the grommet may be positioned around a wire bundle by inserting one end of the wire bundle through the opening 208 of the grommet, as the disclosure is not so limited.

In FIG. 10B, the bushing 100 is positioned in a closed configuration around a grommet 300, according to another embodiment. The grommet 300 has an opening 308 that has a smaller diameter than the opening 208 of grommet 200 of FIG. 10A. Exemplary diameters for the openings of grommets 200 and 300 are 0.1 inches, 0.25 inches, 0.5 inches, 0.75 inches, and 1.0 inch. In some embodiments the grommets 200, 300 may have tubular walls of varying thicknesses or may include one or more bumps extending from an internal surface (as described above with respect to FIGS. 7A-7D) to reduce the diameter of the opening.

Accordingly, in some embodiments, a bushing 100 may fit around grommets with varying internal diameters or profiles to accommodate a wide range of wire bundles secured to support structures. For example, during construction of an airplane, a user may choose an appropriately sized grommet depending on the wire bundle being secured to a structure. It should be noted that although the disclosure describes a bundle of wires passing through the openings of the grommets, any element or elongated body may be secured to a structure in the bushing assemblies described herein. It should also be noted that bushings having varying sizes and shapes may be used in the bushing assemblies. The ability to choose among bushings and grommets having various sizes and shapes provides a broad range of options for quickly and easily securing wires or other elements in support structures in airplanes or other constructs.

Figure 11:
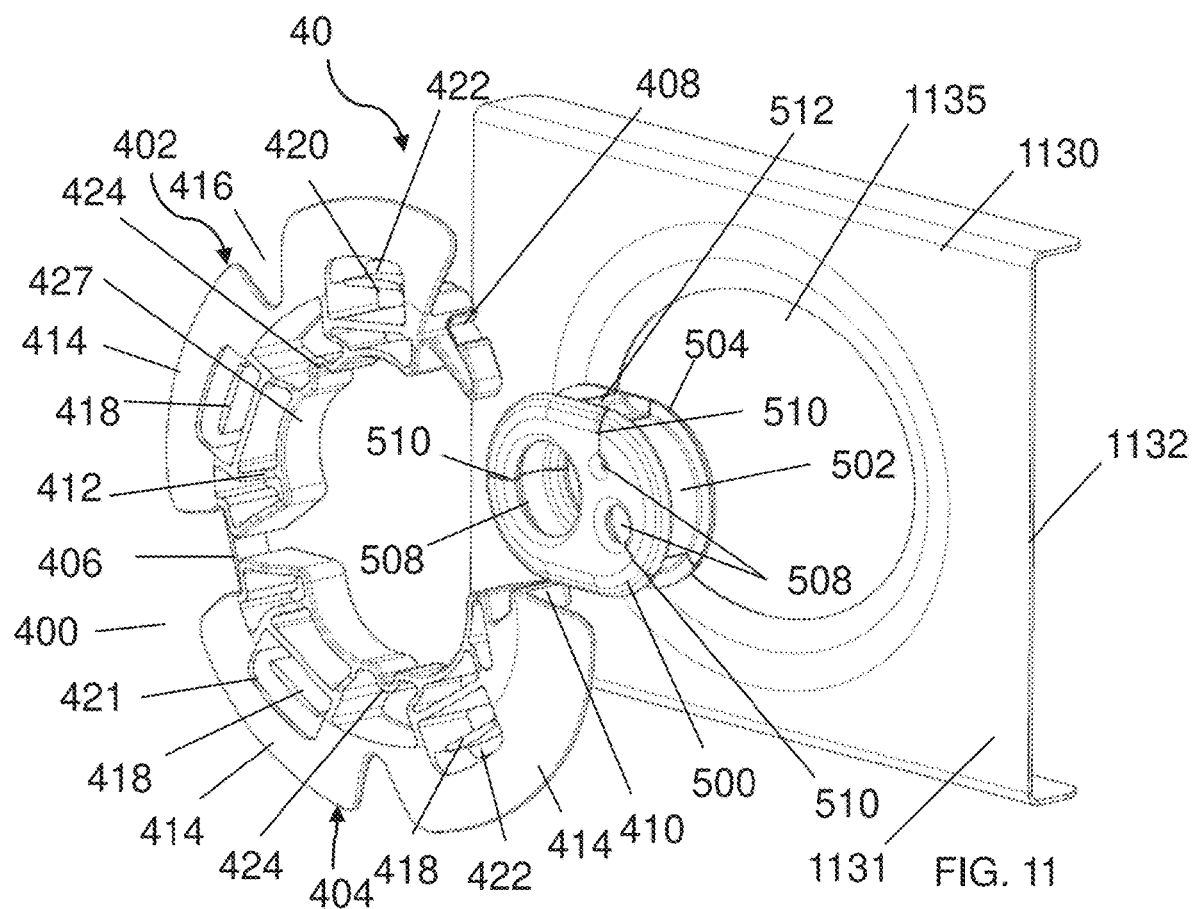
FIG. 11 illustrates a support assembly, according to an embodiment.
Figure 12:
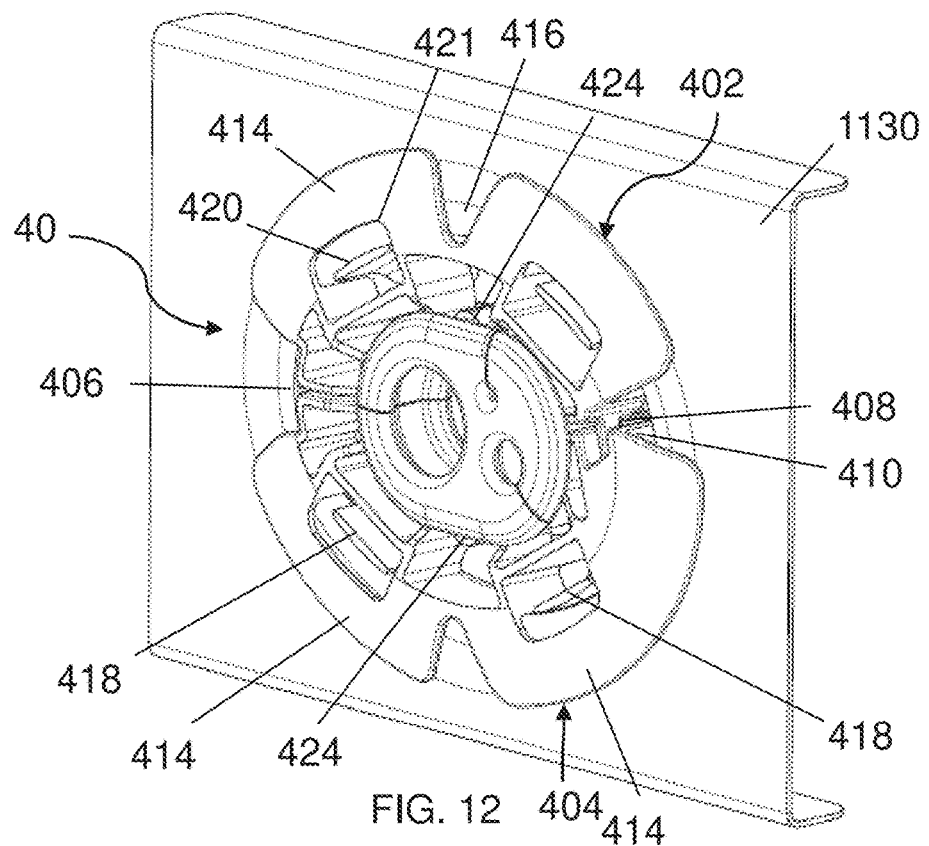
FIG. 12 illustrates the support assembly of FIG. 11 installed in an opening according to an embodiment.

FIGS. 11 and 12 illustrate a support assembly 40 according to another embodiment. FIG. 11 illustrates the support assembly 40 before being installed in an opening 1135 of a structure 1130 (e.g., wall) and FIG. 12 illustrates the support assembly installed in the opening 1135. For simplicity, the support assembly 40 is not shown supporting a bundle or wires or any other elements in the opening. Similar to the embodiments of the support assembly 10 of FIGS. 1-2, the support assembly 40 may include a grommet 500 and a bushing 400 configured to attach to an outer surface 502 of the grommet. In some embodiments, the bushing 400 includes first and second members 402, 404 that are attached at first ends via a hinge 406. The first and second members may be moved between open and closed configurations and secured in the closed configuration via a latch 408 configured to engage a housing 410 on second ends.

In some embodiments, when in a closed configuration, curved inner portions 412 of the first and second members 402, 404 may cooperate to form a partial or complete ring with a curved inner surface 427 that is shaped and sized to fit around the outer surface 502 of grommet 500. The inner surface 427 of the bushing and the outer surface 502 of the grommet may have an obround or stadium cross-sectional shape. In some embodiments, the grommet 500 may include one or more openings 508 that extend through the width of the grommet to retain and secure one or more different wire bundles. Each opening 508 may include a slit 510 to allow the grommet to be opened at the slit and insert the bundle of wires into the opening along a portion of the wires. In some embodiments, an end of a wire or wire bundle may be inserted into an opening at one end and passed through the opening 508.

Figure 29:
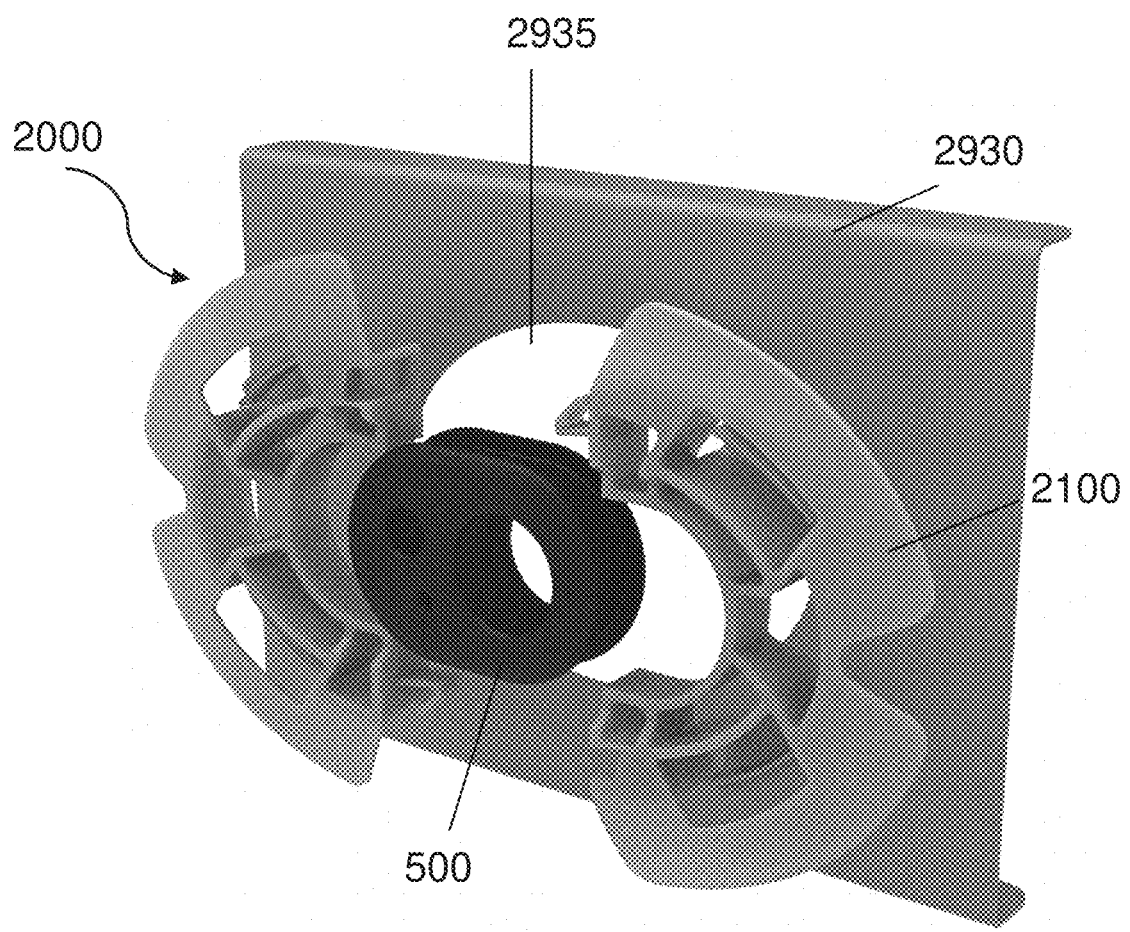
FIG. 29 illustrates a support assembly, according to an embodiment.

In some embodiments, a hinge 406 and latch 408 may be positioned on a shorter length of the obround shape, as shown, however, the disclosure is not so limited and the hinge and latch may be positioned on a longer length or other position of the obround shape (see FIG. 29, for example). The latch 408 and housing 410 may be similar to the latch and housing described above with respect to the bushing 100 of FIGS. 3-6, however, bushing 400 may include any type of latching mechanism to secure the first and second member 402, 404 in a closed configuration, as the disclosure is not so limited.

In some embodiments, to assist in properly positioning the bushing 400 on the grommet 500, the grommet 500 may include flanges 504 that extend around the perimeter of the grommet on each end and one or more ribs 512 on the outer surface 502 that extend at least partially along a width of the grommet between the flanges 504. In some embodiments, the grommet may include two ribs positioned opposite each other, however, any number of ribs may be placed in any position around the outer surface 502. The bushing 400 may include indents 424 on the inner surface 427 configured to be arranged over the ribs 512 of the grommet to position and orient the bushing with the grommet.

In some embodiments, the support assembly 40, when mounted in opening 1135, may secure one or more wires (not shown) within the opening 1135 (FIGS. 11 and 12). The bushing 400 may include one or more petals 414 that contact a first surface 1131 of structure 1130 and one or more snaps 420 that contact a second surface 1132, opposite the first surface 1131, of structure 1130. In some embodiments, the first and second portions 402, 404 may each include two petals 414 separated by notch 416 that may extend at least partially or completely toward an outer surface 419 of the inner portions 412. The petals 414 may extend from a first side of the bushing and the snaps 420 may extend from a second side and the bushing. The petals 414 and snaps 420 may be similar in structure and function to the petals and snaps described above with respect to embodiments of the bushing of FIGS. 3-6. In some embodiments, the snaps 420 include an end portion 418 that extends through an opening 421 of the petals 414 and a ridge 422 that supports the second surface of the structure 1130.

Figure 13:
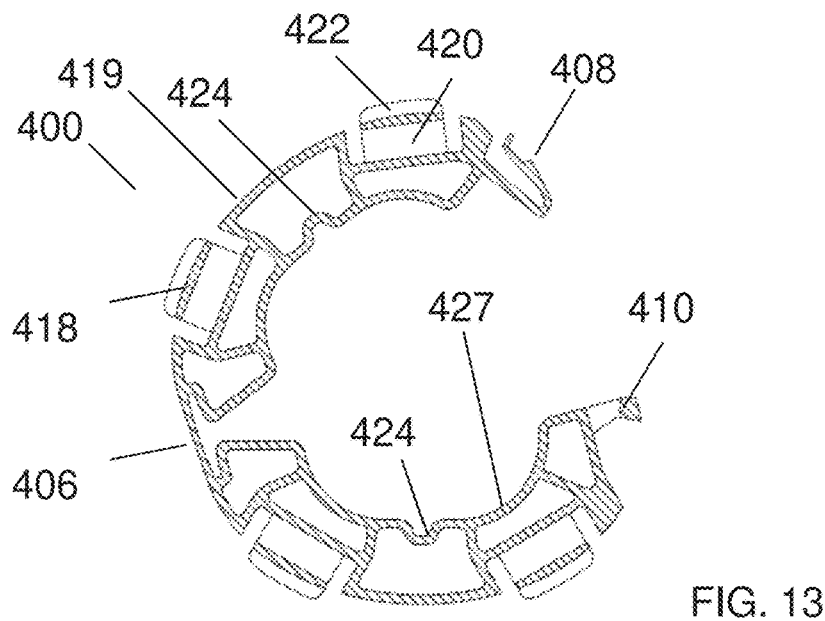
FIG. 13 is a front cross-sectional schematic of the bushing of FIG. 11 in an open configuration, according to an embodiment.
Figure 14:
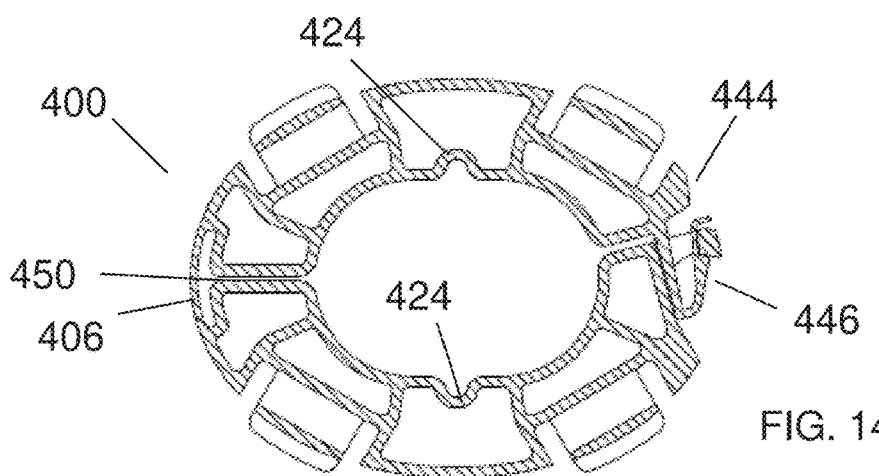
FIG. 14 is a front cross-sectional schematic of the bushing of FIG. 11 in a closed configuration, according to an embodiment.

FIGS. 13-14 show front cross-sectional schematics of the bushing 400 taken along a plane of structure 1130 in open and closed configurations, respectively, according to an embodiment. In the open configuration, the first and second members may move relative to each other and may be opened to be positioned over a grommet. In the closed configuration, the latch 408 is engaged with the housing 410 to lock the members together until a user, as described above, disengages the latch by pressing the latch radially inwards. Cutouts 444 and 446 may provide access to the latch in two locations. In some embodiments, the bushing 400 may include additional reinforcement features at the intersection 450 of the inner portions 412 at the first ends of the first and second members to strengthen the hinge and inner portions in the closed configuration.

In some embodiments, each snap 420 may include an outer surface that forms an outer periphery with the outer surface 419 of the inner portions 412. The bushing may be installed in an opening sized and shaped to accommodate the size and shape of the outer surface 419 of the bushing. Each snap 420 may include a ridge 422 that abuts the second surface of the structure to secure the bushing 400 in the opening. As described above, the petals 412 and the snaps 420 provide countering forces to stabilize and secure the bushing in the opening.

Figure 15:
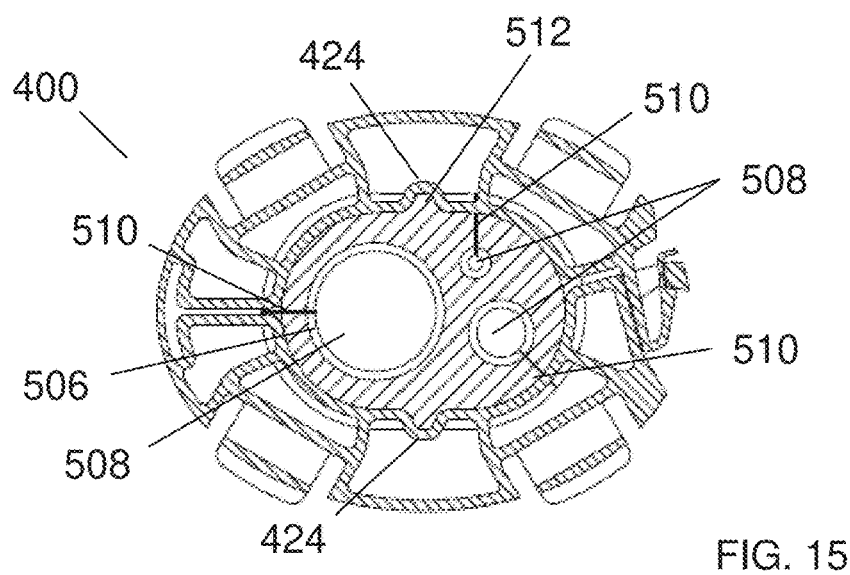
FIG. 15 is a front cross-sectional schematic of the bushing of FIG. 11 in a closed configuration with a grommet, according to an embodiment.

FIG. 15 shows the support assembly 40 of FIG. 14 with a grommet 500. As shown in FIG. 15, each rib 512 of the grommet is positioned in the indents 424 of the bushing 400 to orient the bushing with the grommet.

Figure 16:
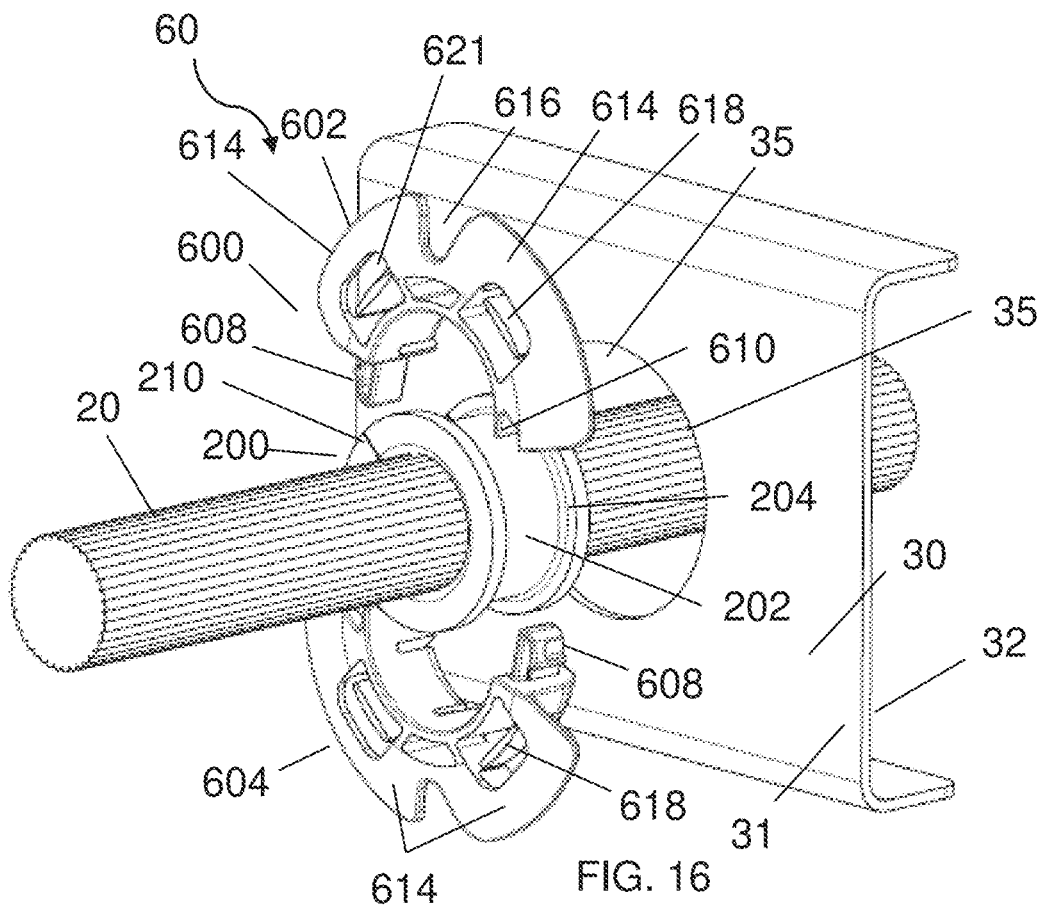
FIG. 16 illustrates a support assembly, according to an embodiment.
Figure 17:
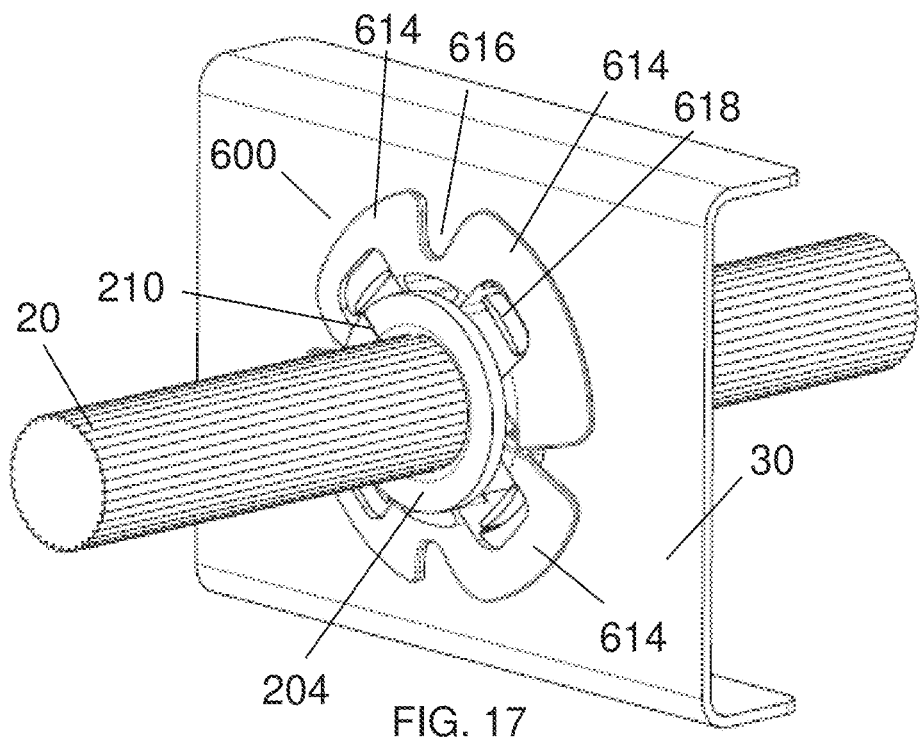
FIG. 17 illustrates the support assembly of FIG. 16 installed in an opening according to an embodiment.

FIGS. 16 and 17 illustrate a support assembly 60 according to an embodiment. FIG. 16 illustrates the support assembly 60 partially installed in an opening 35 of a structure 30 (e.g., wall) to secure one or more wires 20 in the opening and FIG. 17 illustrates the support assembly 60 installed in the opening 35 with wires 20. As shown in FIGS. 16 and 17, the support assembly 60 includes a grommet 200 and a bushing 600 configured to attach to an outer surface 202 of the grommet.

As shown in FIGS. 16-21, the bushing 600 may differ from the bushing 100 in FIGS. 1-6 in that the bushing 600 includes first and second members 602, 604 that are not connected at a first end via a hinge. Rather, the first and second members may be detached completely. In some embodiments, the first and second members may be identical to each other such that the bushing 600 is assembled with two identical members. Accordingly, when assembling the bushing 600, a user may use two members without any need to ensure that there is one of each of the first and second members, to assemble the bushing, simplifying installation. Of course, the disclosure is not so limited, and in some embodiments, the first and second members 602, 604 may be different from each other, such that the support assembly requires one of each of the first member 602 and the second member 604 to connect to each other to assemble the bushing 600.

As shown in FIG. 16, the grommet 200 is positioned around a bundle of wires 20 and the bushing 600 is in an open configuration, such that the first and second members 602, 604 are not engaged with each other. Each of the first and second members 602, 604 may include a male mating portion (e.g., latch 608) at a first end portion and a female mating portion (e.g., housing 610). To assemble the support assembly 60, the first and second members 602, 604 are positioned opposite each other such that the male and female mating portions of the first member are respectively aligned with the female and male mating portions of the second member. The members 602, 604 are brought together around the grommet 200 until the mating portions of the first and second members 602, 604 engage each other. In some embodiments, once the bushing 600 has been attached to the grommet 200, the support assembly 60 may be mounted within opening 35 of structure 30 as described above with FIGS. 1-2.

In the closed configuration, in some embodiments, the support assembly 60 is similar to the support assembly 10 of FIGS. 1 and 2. In some embodiments, when in a closed configuration, curved inner portions 612 of the first and second members 602, 604 may cooperate to form a partial or complete ring with a curved inner surface 627 that is shaped and sized to fit around the outer surface 202 of grommet 200. In some embodiments, the bushing 600 is held securely between the flanges 204 that extend from the outer surface of the grommet 200 at the ends of the grommet.

Figure 20:
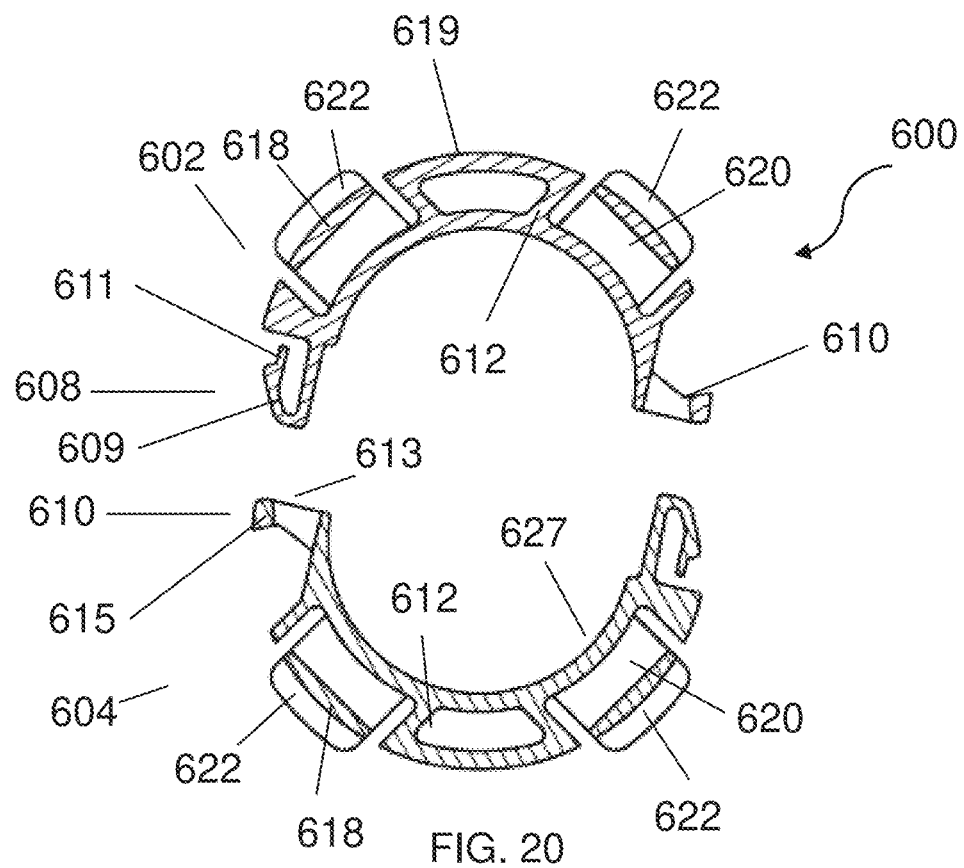
FIG. 20 is a front cross-sectional schematic of the bushing of FIG. 18 in an open configuration, according to an embodiment.
Figure 21:
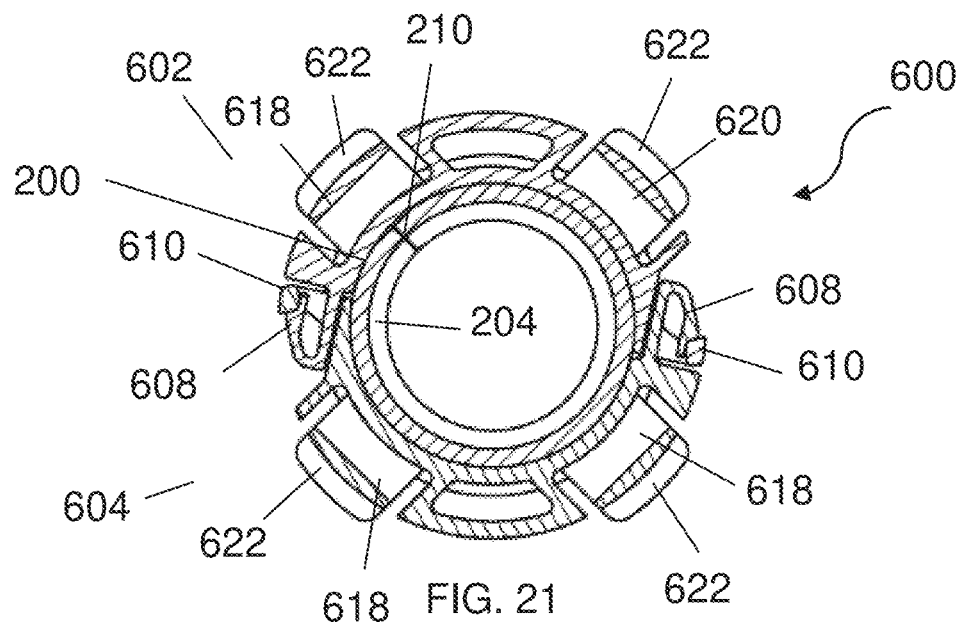
FIG. 21 is a front cross-sectional schematic of the bushing of FIG. 18 in a closed configuration with a grommet, according to an embodiment.

FIGS. 18-21 illustrate an embodiment of bushing 600. FIG. 18 is a front view of the bushing 600 in an open configuration; FIG. 19 is a front perspective view of the bushing 600 in an open configuration; FIG. 20 is a cross-section of the bushing of FIG. 17 taken along a plane of structure 30 in an open configuration; and FIG. 21 illustrates the bushing 600 positioned around a grommet 200 in a closed configuration.

As shown in FIGS. 18-21, in some embodiments, the bushing 600 may include one or more petals 614 and one or more snaps 620, similar to the embodiments described above with respect to FIGS. 3-6. In some embodiments, the one or more petals 614 may contact a first surface 31 of structure 30 and the one or more snaps 620 may contact a second surface 32, opposite the first surface 31, of structure 30 (see FIGS. 16-17). In some embodiments, the first and second portions 602, 604 may each include two petals 614 separated by notch 616 that may extend at least partially or completely toward an outer surface 619 of the inner portions 612. The petals 614 may extend from a first side of the bushing and the snaps 620 may extend from a second side of the bushing. The petals 614 and snaps 620 may be similar in structure and function to the petals and snaps described above with respect to embodiments of the bushing of FIGS. 3-6. In some embodiments, the snaps 620 include an end portion 618 that extends through an opening 621 of the petals 614 and a ridge 622 that supports the second surface of the structure 30. The support assembly 60 may be uninstalled from a front side, or a side of the first surface of structure 30 via the snap end portions 618 through openings 621. The support assembly 60 may also be uninstalled via a side of the second surface of structure 30 via a U-shaped portion of the snap 620 (not shown in FIGS. 18-21, but see FIG. 4B).

FIGS. 20-21 show front cross-sectional schematics of the bushing 600 taken along a plane of structure 30 in open and closed configurations, respectively, according to an embodiment. In the open configuration, the first and second members are detached from one another. As mentioned above, the first and second members may be identical and may include a latch 608 at a first end portion and a housing 610 at a second end portion configured to receive the latch 608 of the opposing member. In some embodiments, the latch 608 includes a flexible U-shaped arm 609 and an extension arm 611 that extends form the U-shaped arm. The U-shaped arm 609 may have a thickness that increases as it moves towards an end portion and the extension arm 611 may have a thickness less than a thickness of the end portion of the U-shaped arm 609.

In some embodiments, when moving the bushing 600 from an open configuration to a closed configuration, the U-shaped arm 609 may enter a channel 613 of the housing 610 and compress against wall 615, causing a camming action and the U-shaped arm 609 to flex radially inward. Once the U-shaped arm 609 passes by the wall 615, the latch 608 may spring back to its original position, and the arm 611 may engage the wall 615 to secure the bushing 600 in the closed configuration, as shown in FIG. 21.

As shown in FIG. 21, the inner portions 612 may include a cutout in the end portions to allow a user to access the U-shaped arm 609 of each member 602, 604 to disengage each latch 608 from the housings 610 and move the bushing 600 back to an open configuration. A user may press the U-shaped arm 609 radially inward to disengage the arm 611 from wall 615 and allow the U-shaped arm 609 to be removed from the channel 613.

As shown in FIGS. 20-21, in some embodiments, each snap 620 may include an outer surface that forms an outer periphery with the outer surface 619 of the inner portions 612. The bushing 600 may be installed in an opening sized and shaped to accommodate the size and shape of the outer surface 619 of the bushing. Each snap 620 may include a ridge 622 that abuts the second surface of the structure to secure the bushing 600 in the opening. As described above, the petals 612 and the snaps 620 provide countering forces to stabilize and secure the bushing 600 in the opening.

Figure 22:
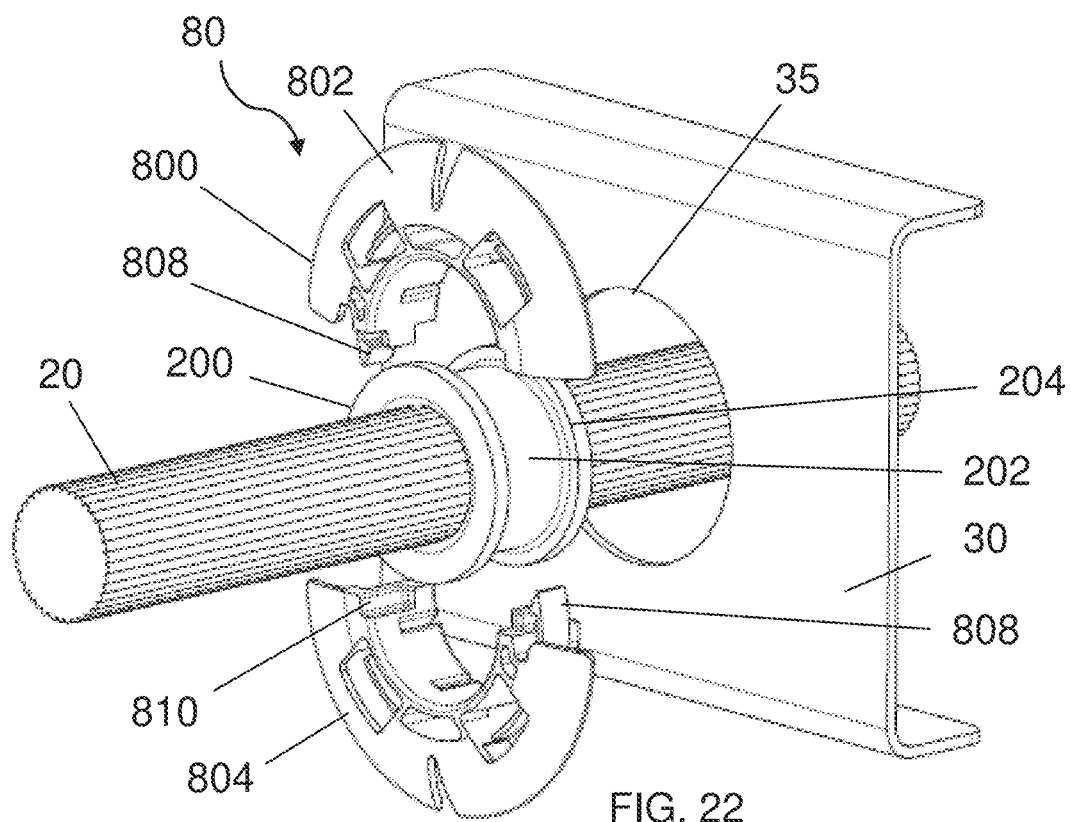
FIG. 22 illustrates a support assembly, according to an embodiment.
Figure 23:
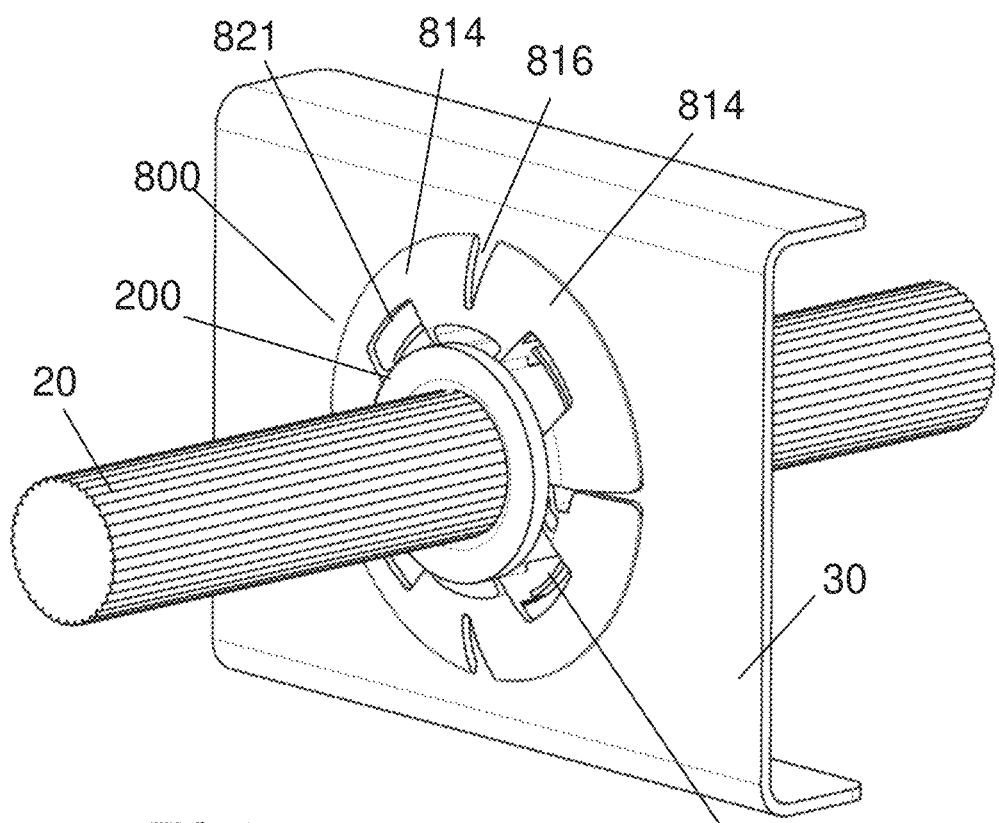
FIG. 23 illustrates the support assembly of FIG. 23 installed in an opening according to an embodiment.

FIGS. 22 and 23 illustrate a support assembly 80 according to an embodiment. FIG. 22 illustrates the support assembly 80 partially installed in an opening 35 of a structure 30 (e.g., wall) to secure one or more wires 20 in the opening and FIG. 23 illustrates the support assembly 80 installed in the opening 35 with wires 20. As shown in FIGS. 22 and 23, the support assembly 80 includes a grommet 200 and a bushing 800 configured to attach to an outer surface 902 of the grommet.

As shown in FIGS. 24-27, a bushing 800 of the support assembly 80 may be similar to the bushing 600 described in FIGS. 18-21 such that the bushing includes first and second members 802, 804 that are separate from each other. The first and second members of the bushing 800 may include curved inner portions 812 configured to fit around an outer surface 202 of the grommet between flanges 204 that extend around the perimeter at each end of the grommet. Each member 802, 804 may include one or more petals 814 separated by notches 816 and one or more snaps 820 with end portions 818 that extend through openings 821 in the petals 814, as described above.

It should be noted that the one or more petals of a bushing in any embodiment described herein may have any shape, size, and angular extent. In some embodiments, as shown in FIGS. 22-25, the petals 814 may have an angular extent that extends around almost an entire perimeter of the bushing 800, such that the petals 814 form almost a complete circle. As shown in FIG. 23, the petals 814 of first and second members 802, 804 are proximate to each other. In some embodiments, such as in FIGS. 1-6, the petals 114 may have a lesser angular extent, with notches 116 may be wider than notches 816 in FIGS. 22-25. In FIGS. 1-6, the petals 114 may be shaped and sized to create a gap between the petals 114 of the first and second members when in a closed configuration to allow access to the latch 108 from a front side 140 of the bushing 100. The bushings described herein may alternatively have other numbers of petals, such as two, six or eight.

The bushings in any embodiment may also have any type or structure of mating portions to engage the first and second members in a closed configuration. As shown in FIGS. 24-27, in some embodiments, the bushing 800 may include a latch 808 on a first end portion and a housing 810 configured to engage each latch 808 of the opposing member. In some embodiments, the latch may include a first arm 809 with a latching end portion and a second arm 811 that are configured to engage a housing 810 on the opposing member. The housing 810 may include a ridge 815 that engages the latching end portion on the first arm 809. When the first and second members 802, 804 are brought together into the closed configuration, the latching end portion may be shaped as a cam to cause the first arm 809 to flex radially outward as the end portion of the first arm 809 passes over the ridge 815 and then snap back and engage the ridge 815 once the end portion has passed the ridge 815. The second arm 811 may abut against an opposite surface of the ridge 815 to secure the ridge between the second arm 811 and the first arm 809 to lock the bushing 800 in the closed configuration. To move the bushing to the open position, the latch 808 may be disengaged from the housing 810 by lifting an end portion of first arm 809 radially outwards to disengage the end portion of the first arm 809 from the ridge 815.

As shown in FIG. 27, in the closed configuration, in some embodiments, the curved inner portions 812 of the first and second members 802, 804 may cooperate to form a partial or complete ring with a curved inner surface 827 that is shaped and sized to fit around the outer surface 202 of grommet 200. In some embodiments, the bushing 800 is held securely between the flanges 204 that extend from the outer surface of the grommet 200 at the ends of the grommet. The grommet 200 may include a radial slit 210 through an entire length of a wall of the grommet to allow the grommet to be opened along the length and placed around a portion of a bundle of wires along a length of the wires. Alternatively, an end of the wires may be inserted into an opening 208 that extends through a length of the grommet 200.

Figure 28:
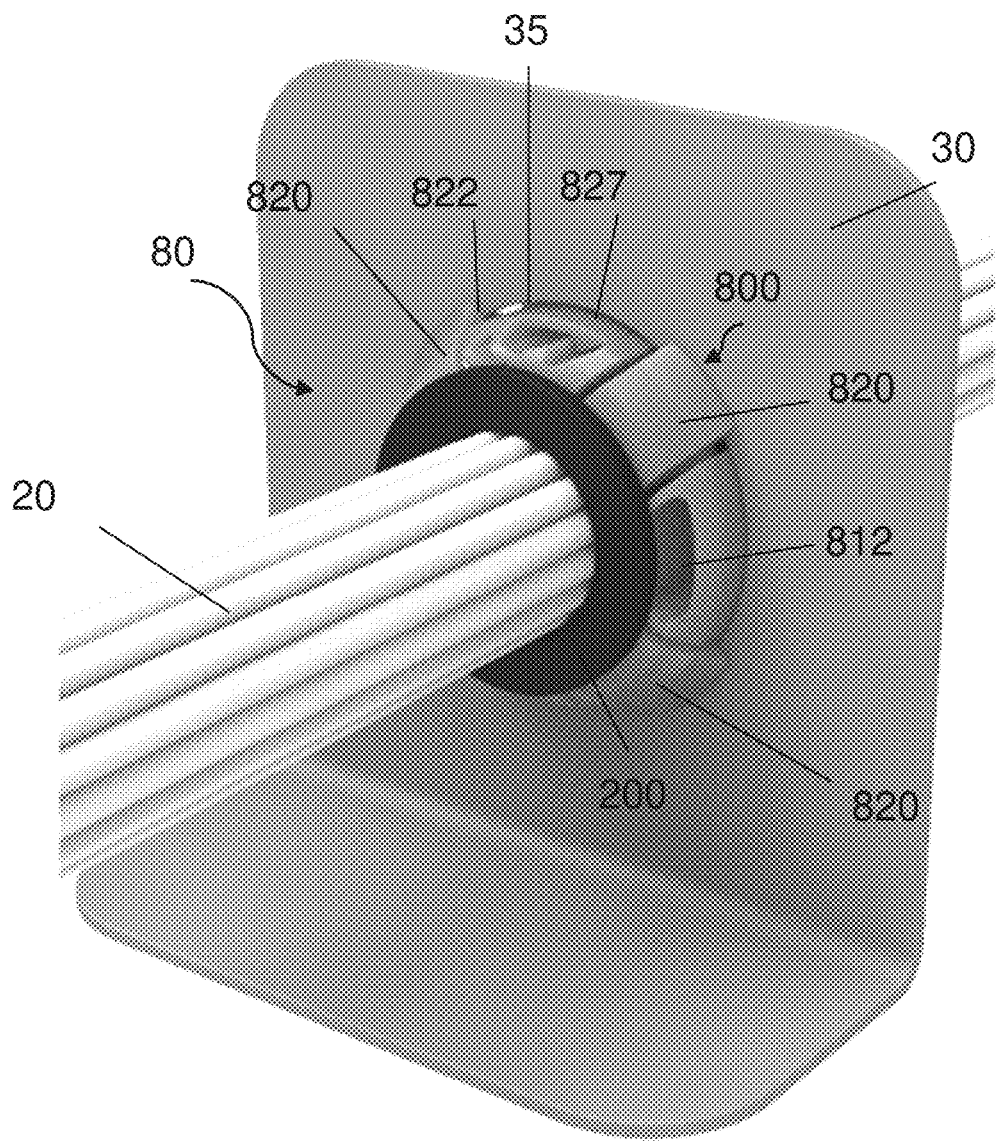
FIG. 28 is a rear perspective view of a support assembly installed in an opening, according on an embodiment.

FIG. 28 illustrates a rear perspective view of a support assembly 80 installed in an opening 35 in structure 30 to secure a bundle of wires 20 within the opening 35. As shown, the bushing 800 includes one or more snaps 820 that secure the support assembly in the opening 35. Each snap includes a ridge 822 that abuts against a surface of the structure 30 to prevent the bushing from being pulled out of the opening in a direction toward the opposite surface of the structure. As described above, the wires 20 may be pulled through the opening 35 while the support assembly remains secured in the opening due to the snaps and petals (not shown) on the opposite surface of the structure.

As shown in FIG. 28, the outer surface 827 of inner portion 812 may form an outer perimeter, along with an outer surface of the snaps 820, sized and shaped to fit within the opening 35. In some embodiments, the outer surface of the snaps 820 may form a diameter greater than a diameter of the outer surface 827 of the inner portion 812. In some embodiments, the outer surface 827 may be sized to fit snuggly within the opening. In some embodiments, the outer surface 827 may be sized to have a diameter less than a diameter of the opening such that the outer surface 827 may not contact the inner edge of structure 30. In such embodiments, only an outer surface of the snaps 820 may contact the inner edge of structure 30. In some embodiments, the snaps 820 may be flexible and may flex inwards when installed through the opening, allowing the snaps to have a larger diameter than the outer surface 827 and still be installed through an opening with a smaller diameter. Accordingly, the support assembly 80 may fit within openings having different diameters, or openings having a diameter greater than or equal to the diameter of the outer surface 827 and less than or equal to the diameter of the outer surface of the snaps.

FIG. 29 illustrates a support assembly 2000 according to another embodiment. As shown in FIG. 29, the support assembly 2000 is configured to secure one or more bundles of wires (not shown) in an oval or obround opening 2935 in structure 2930. In some embodiments, the support assembly includes a grommet 500 having an obround shape and one or more openings through a length of the grommet configured to retain and secure the one or more bundles of wires in the opening 2935. In some embodiments, the support assembly 2000 includes a bushing 2100 including two separate and identical members that connect to each other via a latch positioned on the long sides of the obround grommet. It should be noted that any combination of features in the embodiments of the bushing assemblies described above, including in the bushings and grommets, may be included in any support assembly.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A support assembly for securing at least one element in an opening of a structure having first and second opposing surfaces, the support assembly comprising:
 a grommet having an opening to accommodate the at least one element; and
 a bushing configured to clamp around an outer surface of the grommet, wherein the bushing comprises one or more petals configured to contact the first surface of the structure and one or more snaps configured to contact the second surface of the structure.

2. The support assembly of claim 1, wherein the one or more petals extend from a first side of the bushing and the one or more snaps extend from a second side of the bushing.

3. The support assembly of claim 2, wherein each of the one or more petals is arranged opposite each of the one or more snaps.

4. The support assembly of claim 1, wherein the one or more petals apply a force against the first surface of the structure in a first direction, and one more snaps apply a second force against the second surface of the structure.

5. The support assembly of claim 4, wherein the first force is opposite the second force.

6. The support assembly of claim 1, wherein each of the one or more petals is configured to flex to accommodate structures having different thicknesses.

7. The support assembly of claim 1, wherein the one or more petals comprises first and second petals separated by a notch.

8. The support assembly of claim 3, wherein each of the one or more snaps includes a portion that extends through a corresponding opening in the one or more petals.

9. The support assembly of claim 1, wherein the bushing includes an inner portion, and wherein an outer surface of each of the snaps and an outer surface of the inner portion form a uniform perimeter configured to fit within the opening.

10. The support assembly of claim 1, wherein each of the one or more snaps includes a ridge configured to contact the second surface of the structure, and wherein an outer surface of each snap is configured to contact an inner diameter of the opening in the structure.

11. The support assembly of claim 1, wherein the bushing comprises a first member and a second member that are movable with respect to each other.

12. The support assembly of claim 11, wherein the first member includes a male mating portion at a first end portion configured to engage a female mating portion at a first end portion of the second member to maintain the bushing in the closed configuration.

13. The support assembly of claim 11, wherein the first member and the second member are connected at their respective second end portions via a hinge.

14. The support assembly of claim 12, wherein the first member includes a female mating portion at a second end portion configured to engage a male mating portion at a second end portion of the second member to maintain the bushing in the closed configuration.

15. The support assembly of claim 11, wherein the first member and the second member are identical.

16. The support assembly of claim 12, wherein the male mating portion is a latch.

17. The support assembly of claim 16, wherein the latch comprises a U-shaped arm and an extension arm that extends from the U-shaped arm and has a different thickness than the U-shaped arm.

18. The support assembly of claim 17, wherein the female mating portion is a housing, and wherein the housing includes a cutout configured to provide access to the U-shaped arm when the latch is engaged with the housing.

19. The support assembly of claim 17, wherein the first member includes a cutout configured to provide access to the extension arm when the latch is engaged with the female mating portion of the second member.

20. The support assembly of claim 1, wherein the bushing comprises an inner surface having a circular cross-sectional shape.

21. The support assembly of claim 1, wherein the bushing comprises an inner surface having an obround cross-sectional shape.

22. The support assembly of claim 1, wherein the grommet has a tubular shape with a circular cross-section.

23. The support assembly of claim 1, wherein the grommet has a tubular shape with an obround cross-section.

24. The support assembly of claim 1, wherein the grommet includes a pair of opposing flanges configured to restrict movement of the bushing with respect to the grommet when the bushing is secured around the grommet.

25. The support assembly of claim 1, wherein the grommet includes an inner surface comprising at least one bump.

26. The support assembly of claim 1, wherein the grommet includes a radial slit.

27. The support assembly of claim 1, wherein an outer surface of the grommet includes one or more ribs configured to fit within one or more corresponding indents on an inner surface of the bushing when the bushing is secured around the grommet.

28. A method for securing at least one element in an opening of a structure having first and second opposing surfaces, the method comprising:
   positioning a grommet around the at least one element;
   securing a bushing around the grommet; and
   moving the bushing into the opening of the structure so as to engage one or more petals extending radially from the bushing with the first surface of the structure and one or more snaps extending radially from the bushing with the second surface of the structure.

29. A bushing configurable in an open configuration and a closed configuration comprising:
   a first member and a second member, wherein the first member includes a male mating portion at a first end portion of the first member configured to engage a female mating portion at a first end portion of the second member when the bushing in the closed configuration, and wherein each of the first and second members comprises:
   an inner portion,
   one or more petals that extend radially from a first side of the inner portion, and
   one or more snaps that extend from a second side of the inner portion.

* * * * *